US010778617B2

(12) United States Patent
Kim et al.

(10) Patent No.: US 10,778,617 B2
(45) Date of Patent: Sep. 15, 2020

(54) ELECTRONIC DEVICE AND METHOD OF TRANSFERRING DATA IN AN APPLICATION TO ANOTHER APPLICATION

(71) Applicant: Samsung Electronics Co., Ltd., Suwon-si, Gyeonggi-do (KR)

(72) Inventors: Jongmin Kim, Busan (KR); Busic Koag, Gumi-si (KR); Sanghyun Ahn, Daegu (KR); Hoyong Choi, Gumi-si (KR); Jongwu Baek, Gumi-si (KR); Yonghoon Choi, Ulsan (KR); Sangduk Hwangbo, Daegu (KR); Minho Kim, Gumi-si (KR); Yeunwook Lim, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 554 days.

(21) Appl. No.: 14/832,518

(22) Filed: Aug. 21, 2015

(65) Prior Publication Data

US 2016/0065648 A1 Mar. 3, 2016

(30) Foreign Application Priority Data

Aug. 29, 2014 (KR) .......................... 10-2014-0114574

(51) Int. Cl.
| | | |
|---|---|---|
| *G06F 3/048* | (2013.01) | |
| *H04L 12/58* | (2006.01) | |
| *G06F 3/0488* | (2013.01) | |
| *G06F 3/0482* | (2013.01) | |

(52) U.S. Cl.
CPC .......... *H04L 51/043* (2013.01); *G06F 3/0482* (2013.01); *G06F 3/04883* (2013.01); *G06F 3/04886* (2013.01); *G06F 2203/04807* (2013.01)

(58) Field of Classification Search
CPC ... G06F 3/0481; G06F 3/04817; G06F 3/0486
See application file for complete search history.

(56) References Cited

U.S. PATENT DOCUMENTS

| | | | | |
|---|---|---|---|---|
| 8,335,991 | B2 * | 12/2012 | Douceur ............... | G06F 3/0486 715/702 |
| 2010/0175011 | A1 | 7/2010 | Song et al. | |
| 2013/0179816 | A1 | 7/2013 | Seo et al. | |

(Continued)

FOREIGN PATENT DOCUMENTS

| | | |
|---|---|---|
| KR | 10-2010-0081522 A | 7/2010 |
| KR | 10-2013-0097572 A | 9/2013 |

(Continued)

OTHER PUBLICATIONS

Korean Office Action dated Jun. 22, 2020, issued in Korean Application No. 10-2014-0114574.

*Primary Examiner* — Haoshian Shih
(74) *Attorney, Agent, or Firm* — Jefferson IP Law, LLP

(57) ABSTRACT

A method for executing a function of an electronic device is provided. The method includes identifying data of a first application, determining at least one second application in response to a user event and identifying an attribute of each of the at least one second application, and processing the data of the first application based on the attributes of the each of the at least one second application to execute a function related to at least one second application.

21 Claims, 38 Drawing Sheets

(56) References Cited

U.S. PATENT DOCUMENTS

| | | | |
|---|---|---|---|
| 2013/0222283 A1 | 8/2013 | Yun | |
| 2013/0326415 A1* | 12/2013 | Park | G06F 3/04817 |
| | | | 715/835 |
| 2014/0075063 A1 | 3/2014 | Zhou | |
| 2014/0101566 A1* | 4/2014 | Mulloy | G06F 9/4443 |
| | | | 715/748 |
| 2014/0137223 A1 | 5/2014 | Wagner et al. | |
| 2014/0137234 A1 | 5/2014 | Chin | |
| 2014/0143687 A1 | 5/2014 | Tan et al. | |
| 2014/0215372 A1* | 7/2014 | Reissman | G06F 3/0486 |
| | | | 715/770 |

FOREIGN PATENT DOCUMENTS

| | | |
|---|---|---|
| KR | 10-2013-0133460 A | 12/2013 |
| KR | 10-2014-0055133 A | 5/2014 |

* cited by examiner

ELECTRONIC DEVICE AND METHOD OF TRANSFERRING DATA IN AN APPLICATION TO ANOTHER APPLICATION

CROSS-REFERENCE TO RELATED APPLICATION(S)

This application claims the benefit under 35 U.S.C. § 119(a) of a Korean patent application filed on Aug. 29, 2014 in the Korean Intellectual Property Office and assigned Serial No, 10-2014-0114574, the entire disclosure of which is hereby incorporated by reference.

TECHNICAL FIELD

The present disclosure relates to an electronic device and a method of executing a function related to an application thereof.

BACKGROUND

An electronic device has been developed to receive a user input and provide an intuitive response. A complex menu for a function execution gradually has been phased out, and various types of user interfaces are being developed.

Various electronic devices as well as a mobile terminal such as a current smart phone or a tablet personal computer (PC) have a touch panel so as to intuitively process a user input. The touch panel may be provided to a user in a touch screen type by forming one module together with a display panel.

An electronic device may support various applications and may provide various functions through an application.

The above information is presented as background information only to assist with an understanding of the present disclosure. No determination has been made, and no assertion is made, as to whether any of the above might be applicable as prior art with regard to the present disclosure.

SUMMARY

Generally, in order to execute a function of another application using data included in a random application, several user operations are required. A user should edit the data included in the random application, paste the edited data into the other application and execute a corresponding function. For example, when the data in the application is to be transferred to the other application, the user should edit and copy the data of the application and paste the data into the other application, or should store the edited data and attach the edited data to the other application.

Aspects of the present disclosure are to address at least the above-mentioned problems and/or disadvantages and to provide at least the advantages described below. Accordingly, an aspect of the present invention is to provide a method of transferring data in an application to another application.

In accordance with an aspect of the present disclosure, a method of executing a function of an electronic device is provided. The method includes identifying data of a first application, determining at least one second application in response to a user event and identifying an attribute of each of the at least one second application, and processing the data of the first application based on the attributes of the each of the at least one second application to execute a function related to at least one second application.

In accordance with another aspect of the present disclosure, an electronic device is provided. The electronic device includes an input unit configured to receive a user event, a display configured to output a screen, and a control module configured to identify data of a first application, determine at least one second application in response to the user event, identify an attribute of each of the at least one second application, and process the data of the first application based on the attributes of the each of the at least one second application to execute a function related to at least one second application.

In accordance with another aspect of the present disclosure, a method of transferring data between applications or electronic devices intuitively according to a user input is provided, and thus a user's convenience can be improved.

In accordance with another aspect of the present disclosure, an application related to data or a function of an electronic device may be executed through a data transferal between the applications or the electronic devices, and thus inconvenience of an operation can be reduced.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
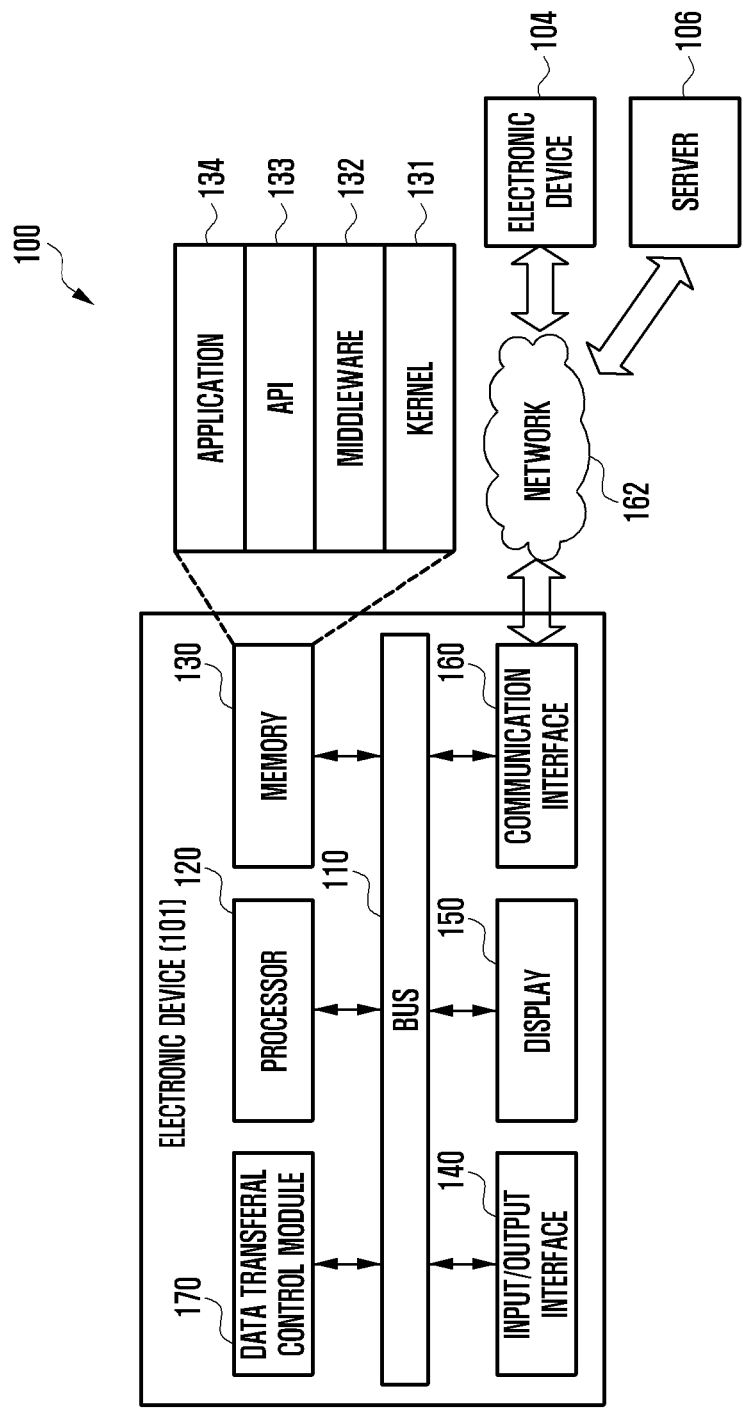
FIG. 1 illustrates a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used in the present disclosure, the expression "include" or "may include" refers to the existence of a corresponding function, operation, or constituent element, and does not limit one or more additional functions, operations, or constituent elements. Further, as used in the present disclosure, the term such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

As used in the present disclosure, the expression "or" includes any or all combinations of words enumerated together. For example, the expression "A or B" may include A, may include B, or may include both A and B.

While expressions including ordinal numbers, such as "first" and "second", as used in the present disclosure may modify various constituent elements, such constituent elements are not limited by the above expressions. For example, the above expressions do not limit the sequence and/or importance of the corresponding constituent elements. The above expressions may be used merely for the purpose of distinguishing a constituent element from other constituent elements. For example, a first user device and a second user device indicate different user devices although both are user devices. For example, a first constituent element may be termed a second constituent element, and likewise a second constituent element may also be termed a first constituent element without departing from the scope of the present disclosure.

When a component is referred to as being "connected" or "accessed" to any other component, it should be understood that the component may be directly connected or accessed to the other component, but another new component may also be interposed between them. Contrarily, when a component is referred to as being "directly connected" or "directly accessed" to any other component, it should be understood that there is no new component between the component and the other component.

The terms as used in various embodiments of the present disclosure are merely for the purpose of describing particular embodiments and are not intended to limit the present disclosure. Singular forms are intended to include plural forms unless the context clearly indicates otherwise.

Unless defined otherwise, all terms used herein, including technical terms and scientific terms, have the same meaning as commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to the present disclosure may be a device including a communication function. For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smartwatch).

According to various embodiments of the present disclosure, the electronic device may be a smart home appliance with a communication function. The smart home appliance as the electronic device, for example, may include at least one of a television, a digital video disc (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic photo frame.

According to various embodiments of the present disclosure, the electronic devices may include at least one of various medical devices (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), an automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) in a shop.

According to various embodiments of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to the present disclosure may be a combination of one or more of the aforementioned various devices. Further, the electronic device according to the present disclosure may be a flexible device. Further, it will be apparent to those skilled in the art that the electronic device according to the present disclosure is not limited to the aforementioned devices.

Hereinafter, an electronic device according to various embodiments of the present disclosure will be discussed with reference to the accompanying drawings. The term "a user" as used in various embodiments of the present disclosure may refer to any person who uses an electronic device or any other device (e.g., an artificial intelligence electronic device) using an electronic device.

FIG. 1 illustrates a network environment including an electronic device according to various embodiments of the present disclosure.

Referring to FIG. 1, the electronic device 101 of a network environment 100 may include a bus 110, a processor 120, a memory 130, an input/output interface 140, a display 150, a communication interface 160, and an data transferal control module 170.

The bus 110 may be a circuit interconnecting the aforementioned components and transmitting communication (e.g., a control message) between the aforementioned components.

The processor 120, for example, may receive instructions from the aforementioned components (e.g., the memory 130, the input/output interface 140, the display 150, the communication interface 160, and the data transferal control module 170) other than the processor 120 through the bus 110, decode the received instructions, and perform operations or data processing according to the decoded instructions.

The memory 130 may store instructions or data received from or generated by the processor 120 or other components (e.g., the input/output interface 140, the display 150, the communication interface 160, and the data transferal control module 170). The memory 130 may include programming modules, for example, a kernel 131, middleware 132, an application programming interface (API) 133, and one or more application 134. Each of the programming modules as described above may be formed by software, firmware, hardware, or a combination of two or more thereof.

The kernel 131 may control or manage system resources (e.g., the bus 110, the processor 120, and the memory 130) used to execute operations or functions implemented in the remaining other programming modules, for example, the middleware 132, the API 133, and the one or more application 134. Further, the kernel 131 may provide an interface that allows the middleware 132, the API 133, or the one or more application 134 to access and control or manage individual components of the electronic device 101.

The middleware 132 may serve to mediate between the API 133 or the one or more application 134 and the kernel 131, that is, allow the API 133 or the one or more application 134 to communicate and exchange data with the kernel 131. Further, the middleware 132 may perform control (e.g., scheduling or load balancing) for task requests received from the one or more application 134 by using, for example, a method of assigning a priority for use of the system resource (e.g., the bus 110, the processor 120, or the memory 130) of the electronic device 101 to at least one of the one or more application 134.

The API 133 is an interface for allowing the one or more application 134 to control functions provided by the kernel 131 and the middleware 132, and may include at least one interface or function (e.g., instruction) for, for example, file control, window control, image processing, or text control.

According to various embodiments of the present disclosure, the one or more application 134 may include a short message service (SMS)/multimedia message service (MMS) application, an e-mail application, a calendar application, an alarm application, a health care application (e.g., an application for measuring the amount of exercise or blood glucose), and an environmental information application (e.g., an application for providing atmospheric pressure information, humidity information, temperature information, and the like). Additionally or alternatively, the one or more application 134 may include an application associated with information exchange between the electronic device 101 and an external electronic device (e.g., an electronic device 104). The application associated with information exchange, for example, may include a notification relay application for transferring specific information to the external electronic device or a device management application for managing the external electronic device.

For example, the notification relay application may include a function of transferring notification information, generated in another application of the electronic device 101 (e.g., the SMS/MMS application, the e-mail application, the health care application, or the environmental information application), to an external electronic device (e.g., the electronic device 104). Additionally or alternatively, the notification relay application, for example, may receive notification information from an external electronic device (e.g., the electronic device 104) and provide the received notification information to a user. The device management application, for example, may manage (e.g., install, remove, or update) a function for at least a part of an external electronic device (e.g., the electronic device 104) communicating with the electronic device 101 (e.g., a function of turning on/off an external electronic device itself (or some components thereof) or adjusting the brightness (or resolution) of a display), an application running on the external electronic device, or a service provided in the external electronic device (e.g., a calling or messaging service).

According to various embodiments, the one or more application 134 may include an application specified according to the attribute (e.g., type) of an external electronic device (e.g., the electronic device 104). For example, when the external electronic device is an MP3 player, the one or more application 134 may include an application associated with music playback. Similarly, when the external electronic device is a mobile medical device, the one or more application 134 may include an application associated with health care. According to an embodiment, the one or more application 134 may include at least one of an application assigned to the electronic device 101 and an application received from an external electronic device (e.g., a server 106 or the electronic device 104).

The input/output interface 140, for example, may transfer instructions or data, input from a user through an input/output device (e.g., a sensor, a keyboard, or a touch screen), to the processor 120, the memory 130, the communication interface 160, or the data transferal control module 170 through the bus 110. For example, the input/output interface 140 may provide the processor 120 with data corresponding to a user's touch input through a touch screen. Further, the input/output interface 140 may, for example, receive instructions or data from the processor 120, the memory 130, the communication interface 160, or the data transferal control module 170 through the bus 110 and output the received instructions or data through the input/output device (e.g., a speaker or a display). For example, the input/output interface 140 may output voice data processed by the processor 120 to a user through a speaker.

The display 150 may display various pieces of information (e.g., multimedia data, text data, etc.) to a user. For example, the display 150 may include a touch screen including a touch panel and a display panel.

The communication interface 160 may establish communication between the electronic device 101 and an external electronic device (e.g., the electronic device 104 or the server 106). For example, the communication interface 160 may be connected to a network 162 through wireless or wired communication and thereby communicate with the external device. The wireless communication, for example, may include at least one of wireless fidelity (Wi-Fi), bluetooth (BT), near field communication (NFC), a GPS, and cellular communication (e.g., long term evolution (LTE), LTE-advanced (LTE-A), code division multiple access (CDMA), universal mobile telecommunications system (UMTS), wireless broadband (WiBro), or global system for mobile (GSM)). The wired communication, for example, may include at least one of a universal serial bus (USB), a high definition multimedia interface (HDMI), recommended standard 232 (RS-232), and a plain old telephone service (POTS).

According to an embodiment, the network 162 may be a telecommunications network. The telecommunications network may include at least one of a computer network, the Internet, the Internet of things, and a telephone network. According to an embodiment, a protocol (e.g., a transport layer protocol, a data link layer protocol, or a physical layer protocol) for communication between the electronic device 101 and an external device may be supported by at least one of the one or more application 134, the application programming interface 133, the middleware 132, the kernel 131, and the communication interface 160.

The data transferal control module 170 may transfer data of a first application to a second application in response to a user event, and may execute a function related to the second application using the transferred data. According to an embodiment, the data transferal control module 170 may transfer the data of the first application to the second application in response to a user event which shifts a first application window to a predetermined position of a second application window. According to another embodiment, the data transferal control module 170 may determine at least one of executed applications as the second application, based on an execution state attribute of the applications executed in the electronic device 101, and may transfer the data of the first application to the second application. The execution state attribute of the application may include at least one of information on whether the application is being executed or is in an execution standby state on at least one processor, information on whether the application is loaded on an execution history or a memory, information on whether the application is scheduled to be executed by a configuration of a timer and the like, information on whether the application is connected to a second electronic device connected to communicate through a network, or information on whether an interrupt is registered. The data transferal control module 170 may determine an application having an execution state attribute corresponding to the user event or a configuration as the second application. The data transferal control module 170 may identify an attribute of the determined second application, and may determine various characteristics of the transferred data based on the identified attribute. The data transferal control module 170 may execute the function related to the second application using the transferred data.

Figure 2:
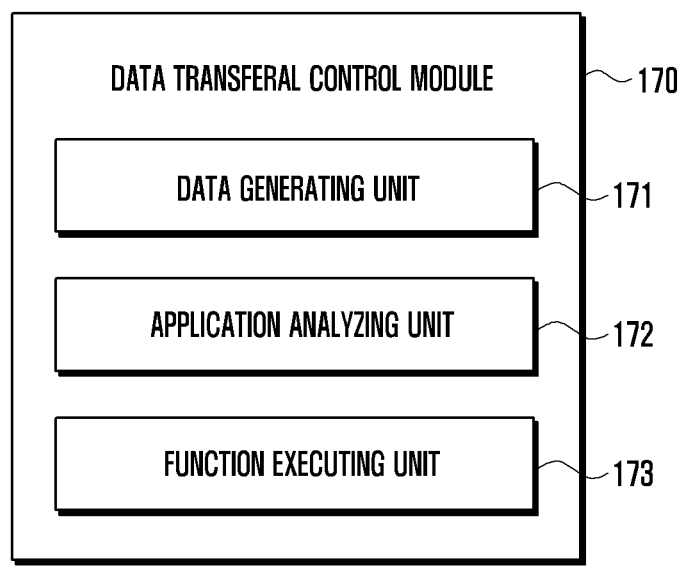
FIG. 2 illustrates a block diagram of a data transferal control module according to various embodiments of the present disclosure.

FIG. 2 illustrates a block diagram of a data transferal control module according to various embodiments of the present disclosure.

Referring to FIG. 2, the data transferal control module 170 may include a data generating unit 171, an application analyzing unit 172 and a function executing unit 173.

According to an embodiment, the data generating unit 171 may generate various pieces of data of the first application. For example, the data of the first application may include at least one of data displayed on the window of the first application, which is obtained through an input, various pieces of raw data of the first application, processed data, a link, a thumbnail image, a text obtained by an optical character recognition (OCR) or effective information. For example, the raw data of the first application may include non-processed data which is being used in the first application.

According to an embodiment, when the second application is determined in response to the user event, the application analyzing unit 172 may identify the attribute of the second application by analyzing the second application. The application analyzing unit 172 may determine at least one application having position information corresponding to the user event, performance information on a system, configuration information on a system or network connection information as the second application, among the executed applications. According to various embodiments of the present disclosure, the application analyzing unit 172 may determine at least one of a sub-window of the second application, data of the second application, a function related to the second application, a state of the second application or a second electronic device related to the second application in response to the user event. The application analyzing unit 172 may identify at least one of an attribute of the determined sub-window of the second application, an attribute of the determined data of the second application, an attribute of the determined function related to the second application, an attribute of the determined state of the second application, or an attribute of the determined second electronic device related to the second application.

According to an embodiment, the function executing unit 173 may process the data of the first application based on the identified attribute of the second application to execute the function related to the second application. For example, the function executing unit 173 may generate the data of the first application corresponding to the attribute of the second application through the data generating unit 171. Alternatively, the function executing unit 173 may select one piece of data corresponding to the attribute of the second application among various pieces of data of the first application, which are generated from the data generating unit 171. The function executing unit 173 may change the attribute of the data of the first application, which is selected according to the attribute of the user event. For example, the function executing unit 173 may change the selected data according to an amount, a size or a maintenance time of the data corresponding to the user event or select data having an attribute corresponding to the conditions. The function executing unit 173 may execute the function related to the second application using the selected data. The function related to the second application may be one of various functions included in the second application, or may be a function of an application related to the second application.

An electronic device according to an embodiment of the present disclosure may include an input unit that receives a user event, a display that outputs a screen, and a control module that identifies data of a first application, determines at least one second application in response to the user event, identifies an attribute of each of the second applications, and processes the data of the first application based on the attributes of the each of the second applications to execute a function related to at least one second application.

The control module according to an embodiment of the present disclosure may receive the user event which shifts a window of the first application to a random position of a window of at least one executed second application, and display the window of the first application correspondingly to the user event.

The control module according to an embodiment of the present disclosure may perform at least one of determining a sub-window of the second application in response to the user event and identifying an attribute of the sub-window of the second application, determining data of the second application in response to the user event and identifying an attribute of the data of the second application, determining the function related to the second application in response to the user event and identifying an attribute of the function related to the second application, changing a state attribute of the second application according to the user event, or determining at least one second electronic device related to the second application according to the user event and identifying each attribute of at least one second electronic device.

The control module according to an embodiment of the present disclosure may perform at least one of transferring the data of the first application to the second application in a format determined based on the attribute of the sub-window of the second application, processing the data of the first application to execute the function related to the second application, based on the attribute of the data of the second application, changing a format of the data of the first application based on the attribute of the function related to the second application to execute the function related to the second application, processing the data of the first application to execute the function related to the second application, based on the state attribute of the second application, or transferring the data of the first application to at least one second electronic device, based on an attribute of at least one second electronic device.

The control module according to an embodiment of the present disclosure may process the identified data as at least one of a thumbnail image, a text obtained by an OCR, raw data, processed data, a link, or effective information, based on the attribute of the second application.

The control module according to an embodiment of the present disclosure may generate the data of the first application as a thumbnail image, a text obtained by an OCR, raw data, processed data, a link, or effective information, select the data of the first application corresponding to the attribute of the second application, among the generated data of the first application, and execute the function related to the second application using the selected data of the first application.

The control module according to an embodiment of the present disclosure may determine the attribute of the transferred data of the first application based on an attribute of the user event, and the attribute of the transferred data of the first application may include at least one of an amount, a size, a brightness or a maintenance time of the transferred data.

The control module according to an embodiment of the present disclosure may further perform at least one of when the data of the first application is processed and the function related to the second application is executed, ending the execution of the first application, when a selection input for the data of the first application is provided from the function related to the executed second application, re-executing the first application, or when the data of the re-executed first application is changed, reflecting the changed data to the function related to the executed second application.

The control module according to an embodiment of the present disclosure may identify at least one of network information, resolution information, processor performance information or position information of at least one second electronic device.

The control module according to an embodiment of the present disclosure may determine at least one second application among the executed applications, based on an execution state attribute of the executed applications, and the execution state attribute of the applications includes at least one of information on whether the application is being executed or is in an execution standby state on at least one processor, information on whether the application is loaded on an execution history or a memory, information on whether the application is scheduled to be executed by a configuration of a timer and the like, information on whether the application is connected to a second electronic device connected to communicate through a network, or information on whether an interrupt is registered.

Figure 3:
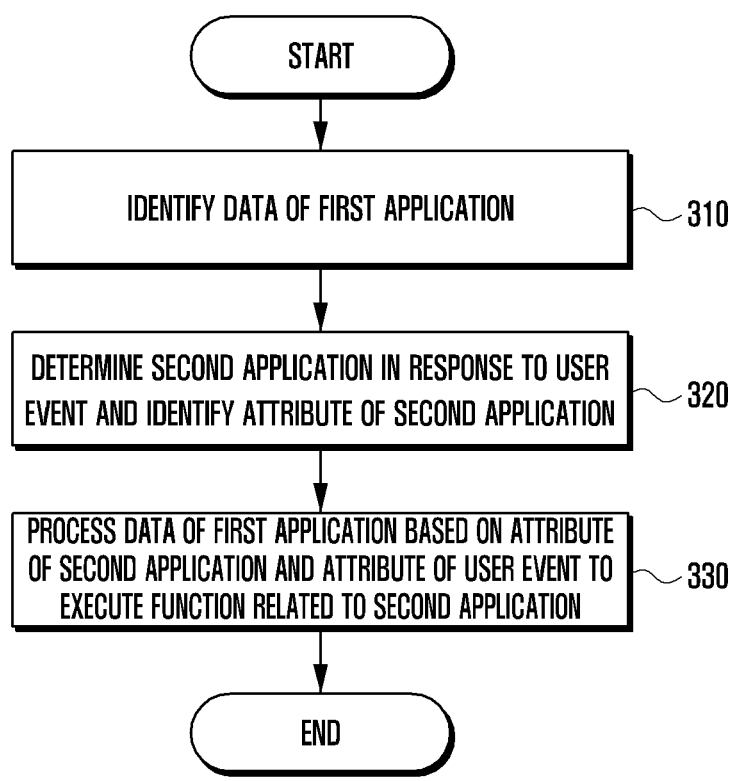
FIG. 3 is a flowchart illustrating a method of executing a function of an electronic device according to various embodiments of the present disclosure.

FIG. 3 is a flowchart illustrating a method of executing a function of an electronic device according to various embodiments of the present disclosure.

Referring to FIG. 3, in operation 310, the electronic device 101 may identify the data of the first application. For example, the electronic device 101 may execute the first application, and may generate various pieces of data in the executed first application. The pieces of data of the first application may be various contents or various formats. Alternatively, the electronic device 101 may execute the first application, and may identify only information of the first application, which is required to obtain the various pieces of data of the first application. For example, the electronic device 101 may not generate the various pieces of data of the first application in advance, and may generate only data of the first application corresponding to the attribute of the second application later.

In operation 320, the electronic device 101 may detect the user event to determine the second application, and may identify the attribute of the determined second application.

For example, the electronic device 101 may select the second application in response to the user event which shifts the first application window to the predetermined position of the second application window. While the electronic device 101 detects the user event which shifts the first application window, the electronic device 101 may display the first application window correspondingly to the user event. For example, the electronic device 101 may shift the first application window correspondingly to the user event by minimizing the first application window in a predetermined size or displaying the first application window as a predetermined object. According to various embodiments of the present disclosure, the electronic device 101 may identify at least one of the attribute of the sub-window of the second application, the attribute of the data of the second application, the attribute of the function related to the second application, the attribute of the state of the second application, or the attribute of the second electronic device related to the second application, which corresponds to the user event, e.g., the position information of the user event.

According to an embodiment, the electronic device 101 may determine at least one of the executed applications as the second application, based on the attribute of the execution state attribute of the executed applications. For example, the electronic device 101 may determine at least one application having the position information corresponding to the user event, the performance information on a system, the configuration information on a system or the network connection information as the second application, among the executed applications. The electronic device 101 may identify the attribute of the determined second application, e.g., the attribute of the function related to the second application.

In operation 330, the electronic device 101 may process the data of the first application based on the identified attribute of the second application to execute the function related to the second application. For example, the electronic device 101 may determine contents or a format of the data corresponding to the identified attribute of the second application. For example, when the first application is a browser application and the second application is a picture editing application, the electronic device 101 may determine the data of the first application as the first application window or an image file of an object in the first application window, based on the attribute of the second application. The electronic device 101 may execute a picture editing function of the second application using the determined image file. According to various embodiments of the present disclosure, the electronic device 101 may change the attribute of the data of the selected first application, according to the attribute of the user event. For example, the electronic device 101 may change the selected data according to the amount, the size, the brightness or the maintenance time of the data corresponding to the attribute of the user event, or may select the data having the attribute corresponding to the above conditions. For example, the electronic device 101 may determine at least one of an amount of a content configuring the image file, the size of the image file, the brightness or an image file display maintenance time, based on the attribute of the user event, e.g., a pressure, a maintenance time, a providing means, or the like.

Figure 4:
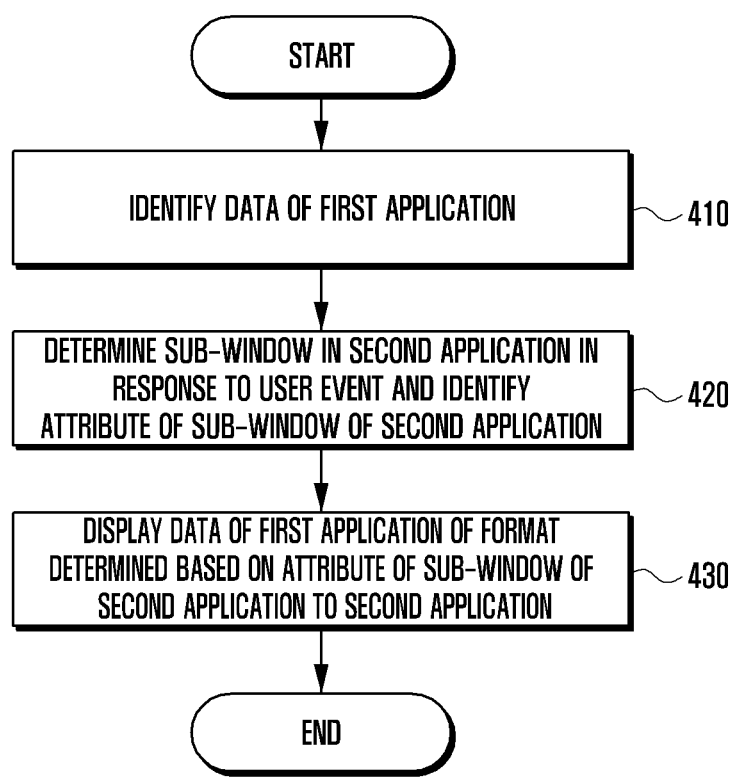
FIG. 4 is a flowchart illustrating a method of transferring data between applications of an electronic device according to an embodiment of the present disclosure.

FIG. 4 is a flowchart illustrating a method of transferring data between applications of an electronic device according to an embodiment of the present disclosure.

Referring to FIG. 4, in operation 410, the electronic device 101 may identify the data of the first application. For example, the electronic device 101 may execute the first application, and may generate various pieces of data in the executed first application. The pieces of data of the first application may be various contents or various formats. Alternatively, the electronic device 101 may execute the first application, and may identify only information of the first application, which is required to obtain the various pieces of data of the first application. For example, the electronic device 101 may not generate the various pieces of data of the first application in advance, and may generate only data of the first application corresponding to the attribute of the second application later.

In operation 420, the electronic device 101 may determine the sub-window of the second application in response to the user event, and may identify the attribute of the determined sub-window of the second application. For example, the electronic device 101 may receive the user event which shifts the first application window to the sub-window of the second application window. For example, the sub-window may be a data input window. The electronic device 101 may identify a data input attribute (e.g., information on whether any type of data is received or not) of the data input window.

In operation 430, the electronic device 101 may transfer the data of the first application of a data format determined based on the attribute of the sub-window of the second application to the second application to display the data of the first application. For example, when the sub-window has an attribute capable of attaching an image file, the electronic device 101 may attach an image of the first application window to the sub-window and may display the image of the first application as a thumbnail image or a file name. The electronic device 101 may determine the attribute of the transferred data of the first application, e.g., the amount, the size, the brightness, the maintenance time, or the like of the data, in response to the attribute of the user event. According to an embodiment, when the data of the first application is transferred to the second application, the electronic device 101 may end the execution of the first application or change (e.g., minimize) the first application window. When a selection input for the first application displayed in the second application is provided in a state wherein the first application is ended, the electronic device 101 may re-execute the first application in relation to the data. When the data of the re-executed first application is changed, the electronic device 101 may reflect the changed data to the transferred data of the second application. For example, when an image of the re-executed first application is changed, an image file of the first application, which is attached to the second application, may be changed together with the image. According to an embodiment, the electronic device 101 may control a maintenance time of the image file of the first application, which is attached to the second application, based on a data maintenance time corresponding to the attribute of the user event. When the maintenance time is elapsed, the image file of the first application, which is attached to the second application, may be deleted, or a changed content in the first application may not be reflected to the image file of the first application, which is attached to the second application, any more.

FIGS. 5A to 5D are screen example views illustrating a data transferal between applications of an electronic device according to an embodiment of the present disclosure.

Figure 5A:
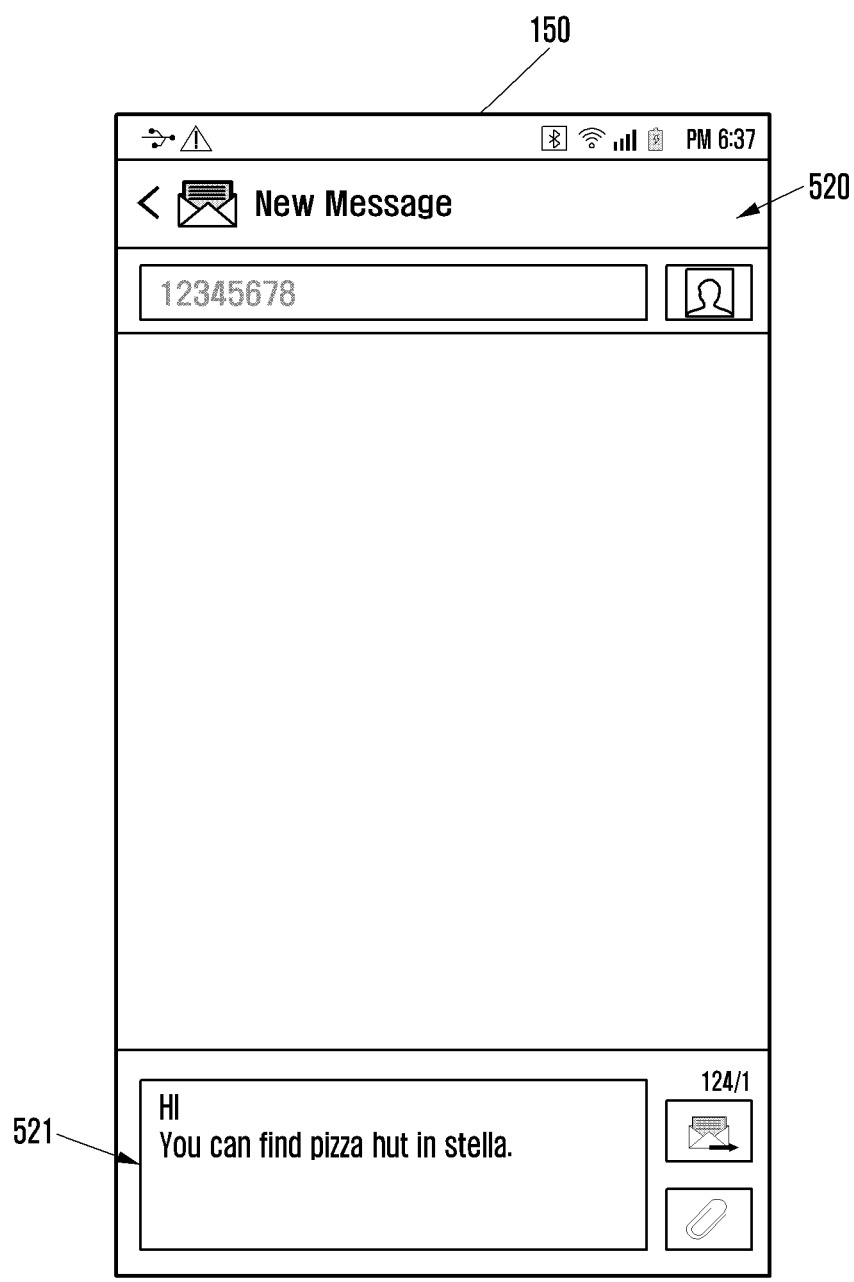
FIGS. 5A, 5B, 5C, and 5D are screen example views illustrating a data transferal between applications of an electronic device according to an embodiment of the present disclosure.
Figure 5B:
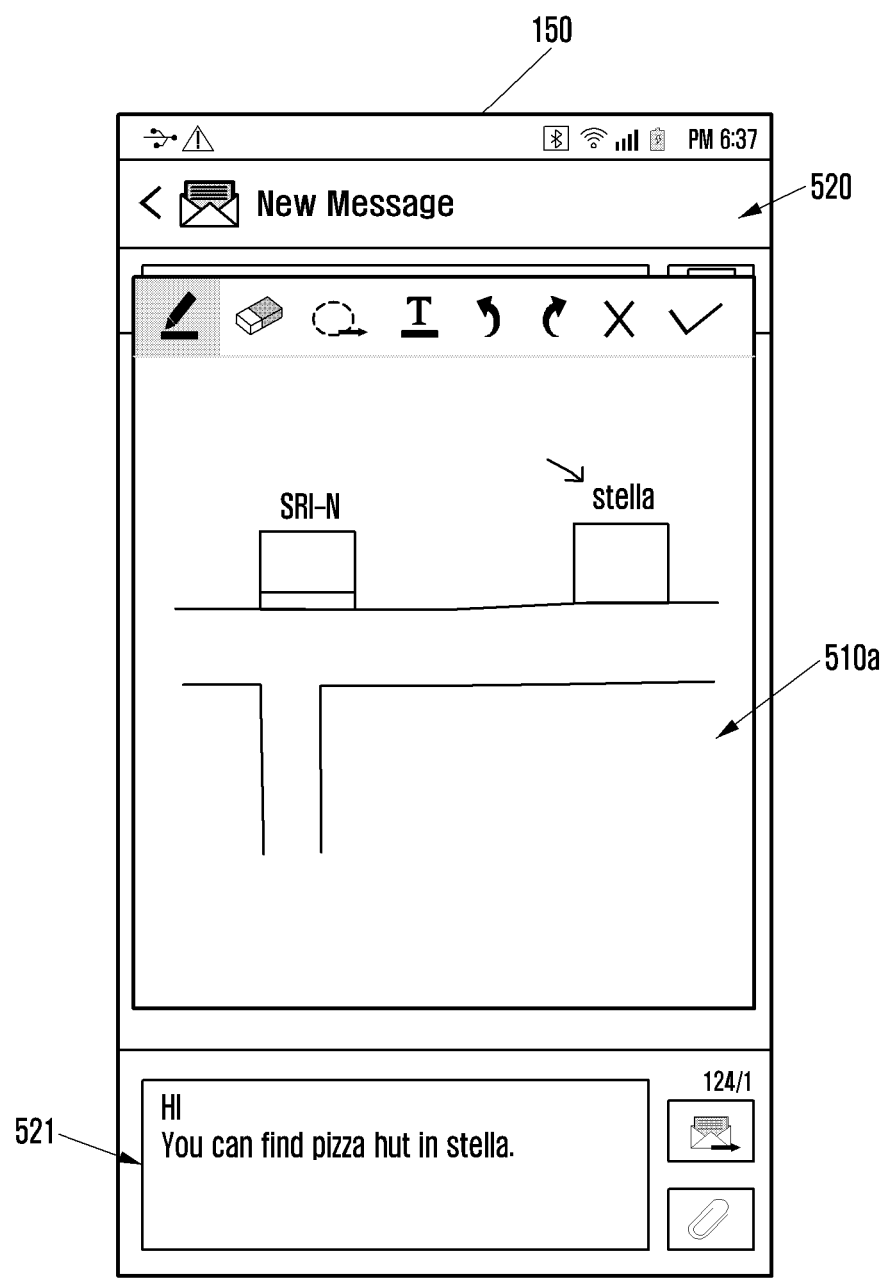
Figure 5C:
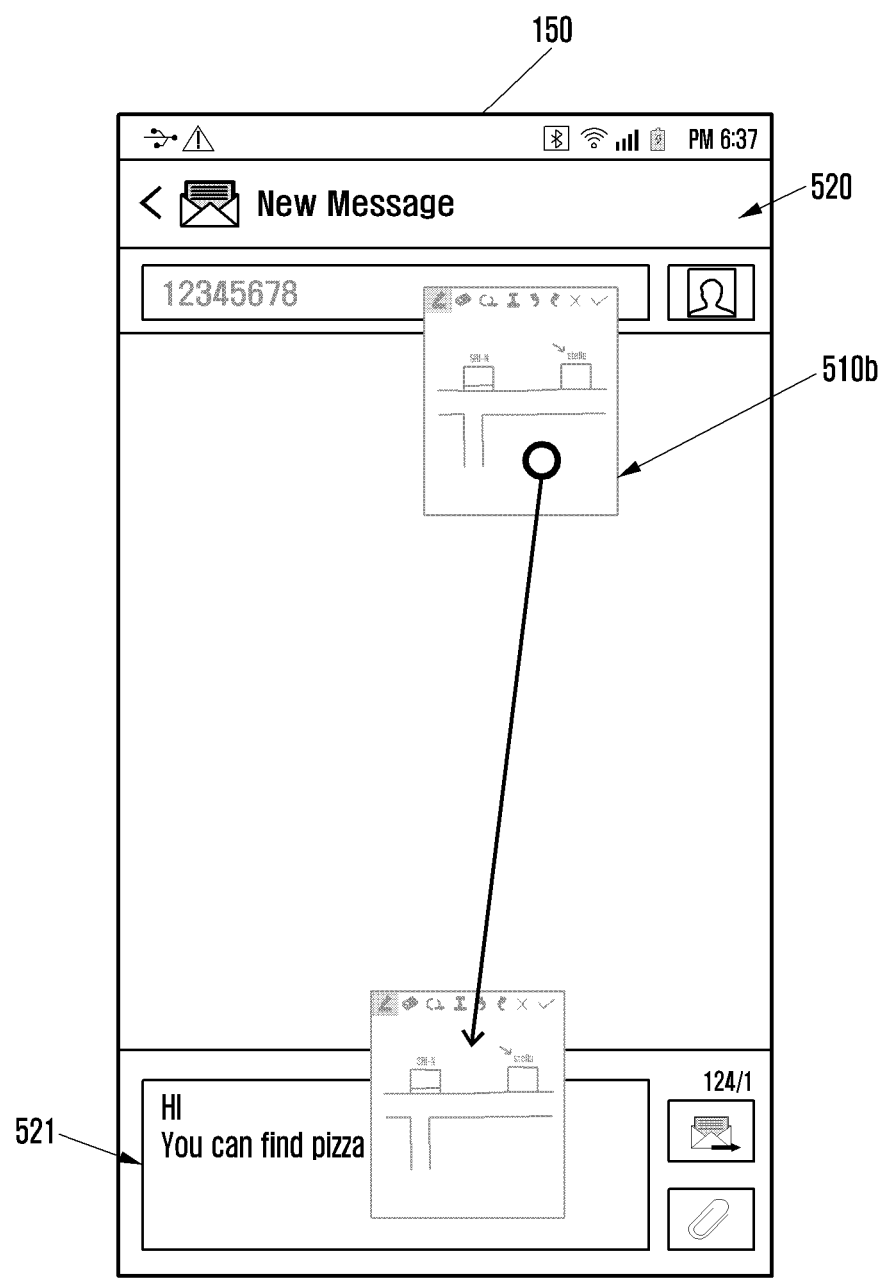
Figure 5D:
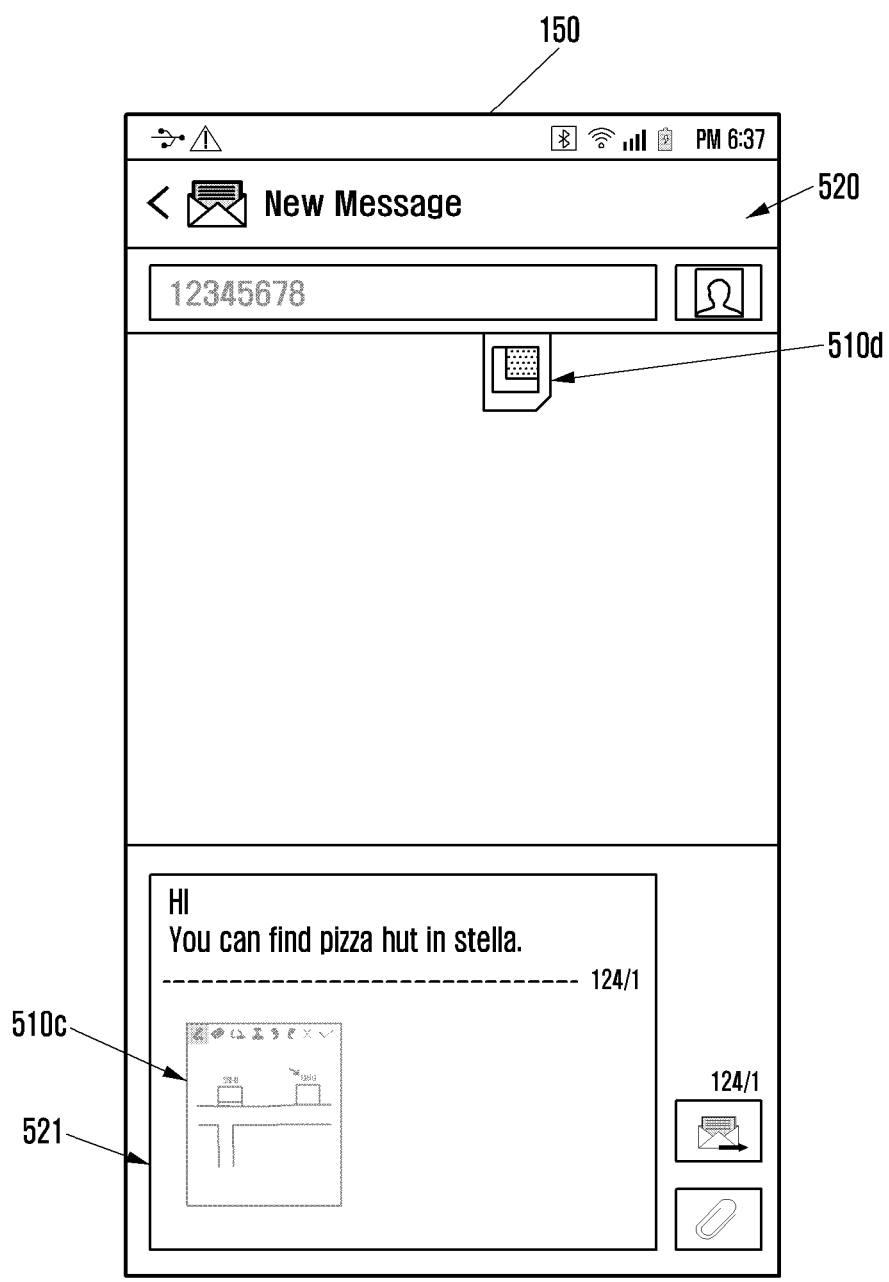

Referring to FIG. 5A, the electronic device 101 may execute a message application and may display a message application window through the display 150. For example, the message application window may be a message write window 520 as shown in the drawings. The message write window 520 may include an input window 521 for writing a message. Referring to FIG. 5B, the electronic device 101 may execute a memo application in a state in which the message application is executed, and for example, the electronic device 101 may overlay a memo write window 510*a* with the message write window 520 to display the memo write window 510*a*. A user may input various memos in the memo write window 510*a*. As shown in FIG. 5C, the user may shift the memo write window 510*b* to the input window 521 of the message write window 520. For example, when the display 150 is a touch screen, the user may drag the memo write window 510*b* to the input window 521 of the message write window 520. For example, while a drag input is provided, the electronic device 101 may display the memo write window 510*b* in a predetermined minimized size, which is shifted correspondingly to the drag input. Referring to FIG. 5D, the electronic device 101 may identify that the input window 521 has an attribute capable of receiving a text or an image file, and may display the memo write window to the input window 521 as, for example, a thumbnail image 510*c*. When the memo write window is displayed in the input window 521 as the thumbnail image 510*c*, the electronic device 101 may end the memo application or may minimize the memo write window to display the memo write window as a mini window 510*d*. Although not illustrated, when the electronic device 101 receives an input which selects the mini window 510*d* or the thumbnail image 510*c*, the electronic device 101 may re-execute the memo application and re-output a corresponding memo write window. For example, when a memo is changed in the re-output memo write window, the electronic device 101 may reflect a changed image to the thumbnail image 510*c*.

Figure 6A:
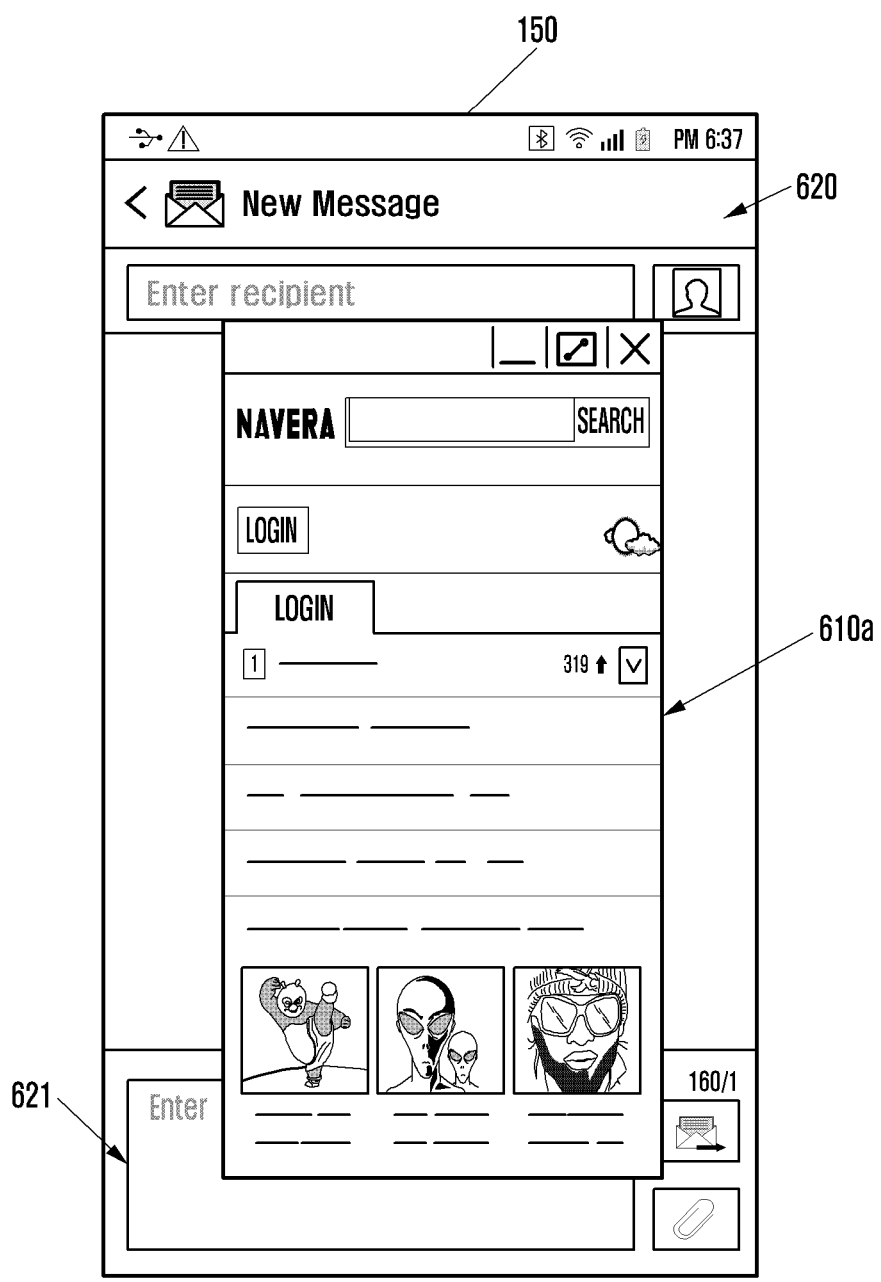
FIGS. 6A, 6B, and 6C are screen example views illustrating a data transferal between applications of an electronic device according to an embodiment of the present disclosure.
Figure 6B:
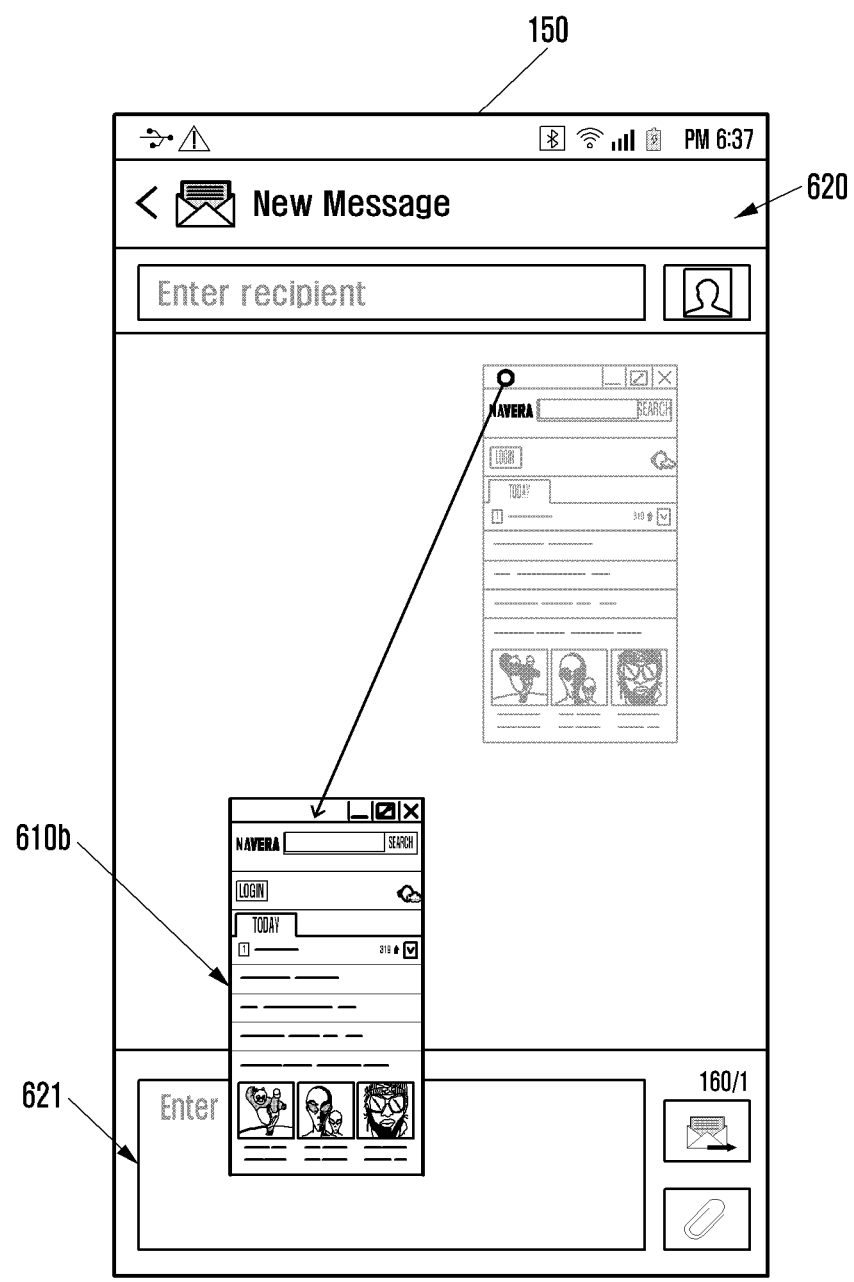
Figure 6C:
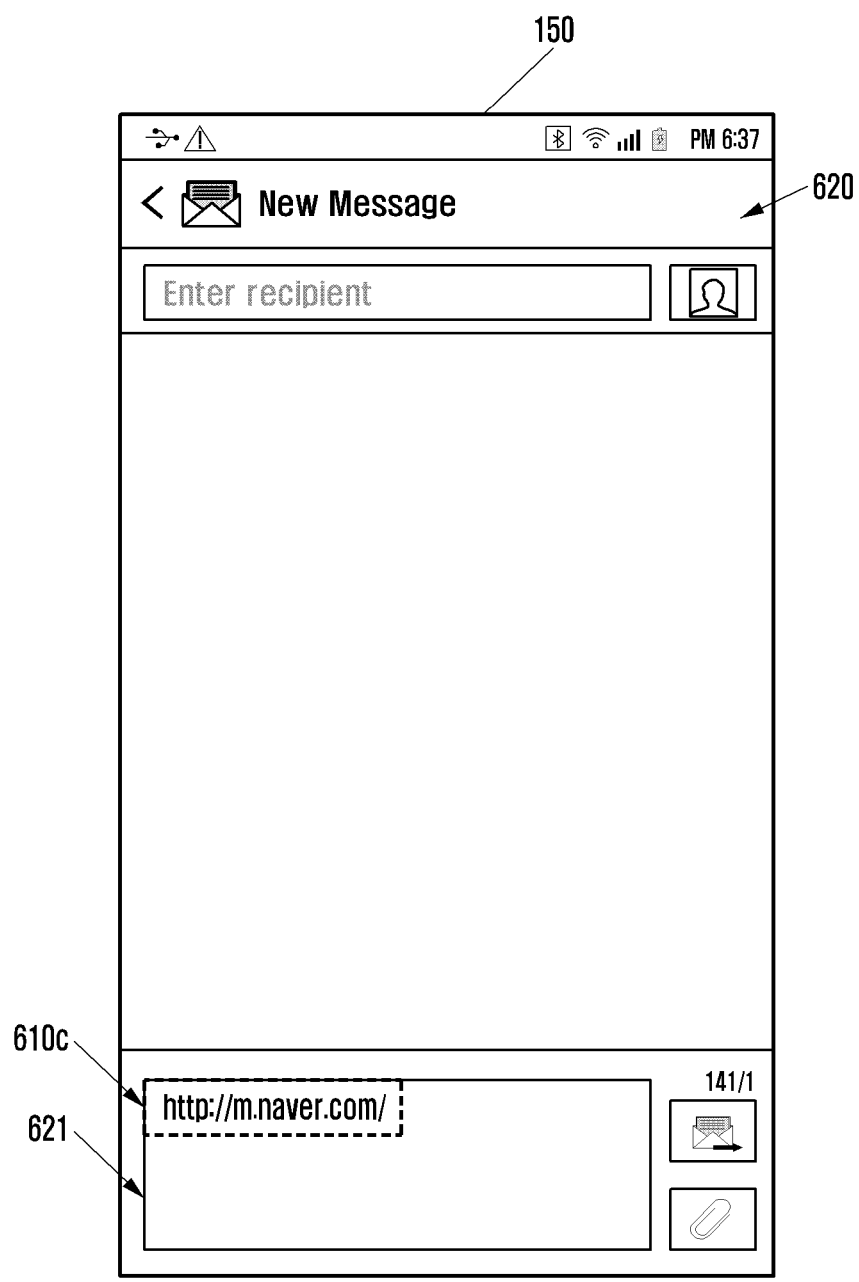

FIGS. 6A to 6C are screen example views illustrating a data transferal between applications of an electronic device according to an embodiment of the present disclosure.

Referring to FIG. 6A, the electronic device 101 may execute a message application and may display a message application window through the display 150. For example, the message application window may be a message write window 620 as shown in the drawings. The message write window 620 may include an input window 621 for a message writing. The electronic device 101 may execute a browser application in a state in which the message application is executed, and for example, the electronic device 101 may overlay a browser window 610*a* with the message write window 620 to display the browser window 610*a*. A user may perform websurfing through the browser window 610*a*. As shown in FIG. 6C, the user may shift the browser window 610*a* to the input window 621 of the message write window 620. For example, when the display 150 is a touch screen, the user may drag the browser window 610*a* to the input window 621 of the message write window 620. For example, while a drag input is provided, the electronic device 101 may display the browser window 610*b* in a predetermined minimized size, which is shifted correspondingly to the drag input. Referring to FIG. 6C, the electronic device 101 may identify that the input window 621 is an attribute capable of receiving a link object, and may display a URL address of a corresponding browser window in the input window 621 as a link object 610*c*. When the browser window is displayed in the input window 621 as the link object 610*c*, the electronic device 101 may end the browser application or may minimize the browser window to display the browser window as a mini window.

Figure 7A:
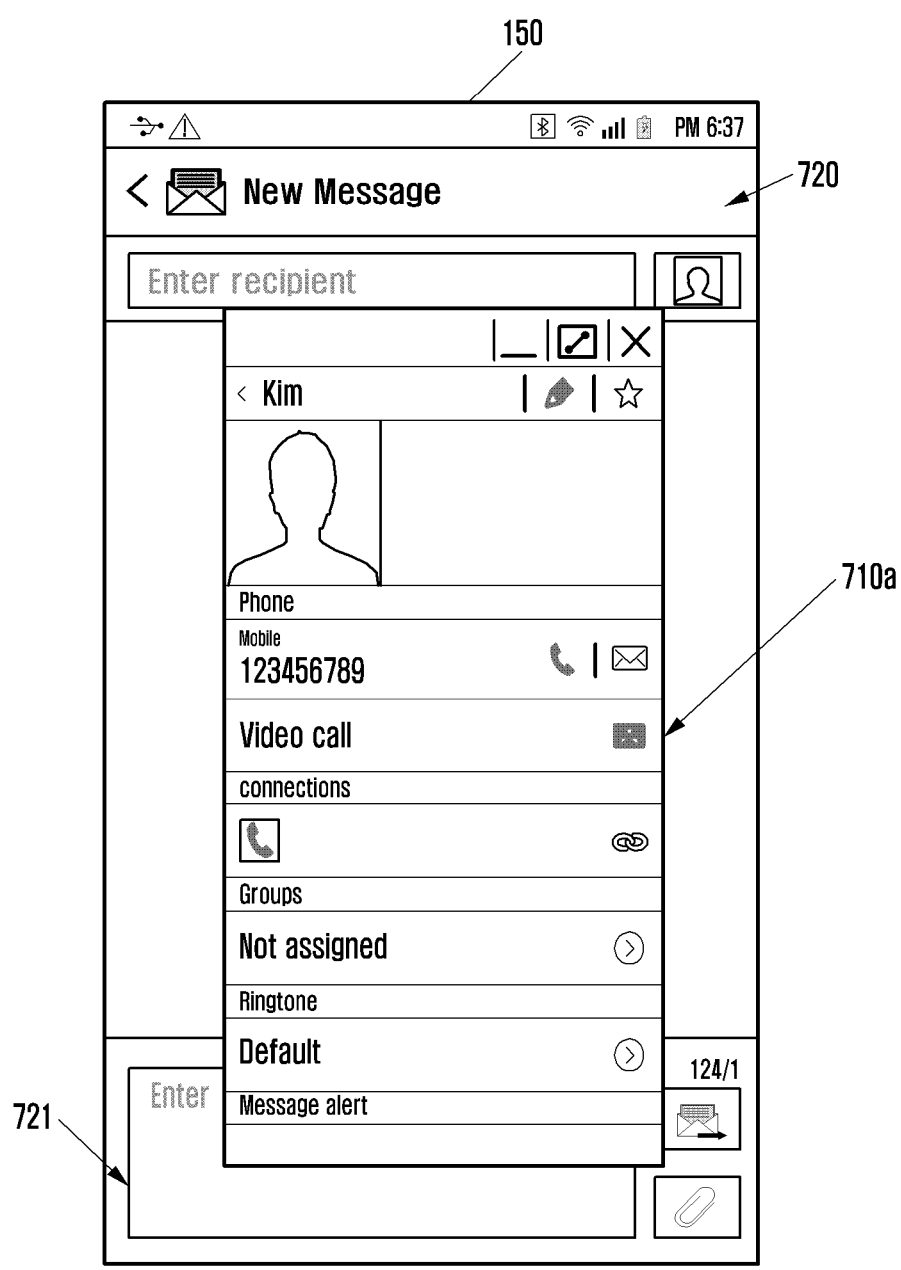
FIGS. 7A, 7B, and 7C are screen example views illustrating a data transferal between applications of an electronic device according to an embodiment of the present disclosure.
Figure 7B:
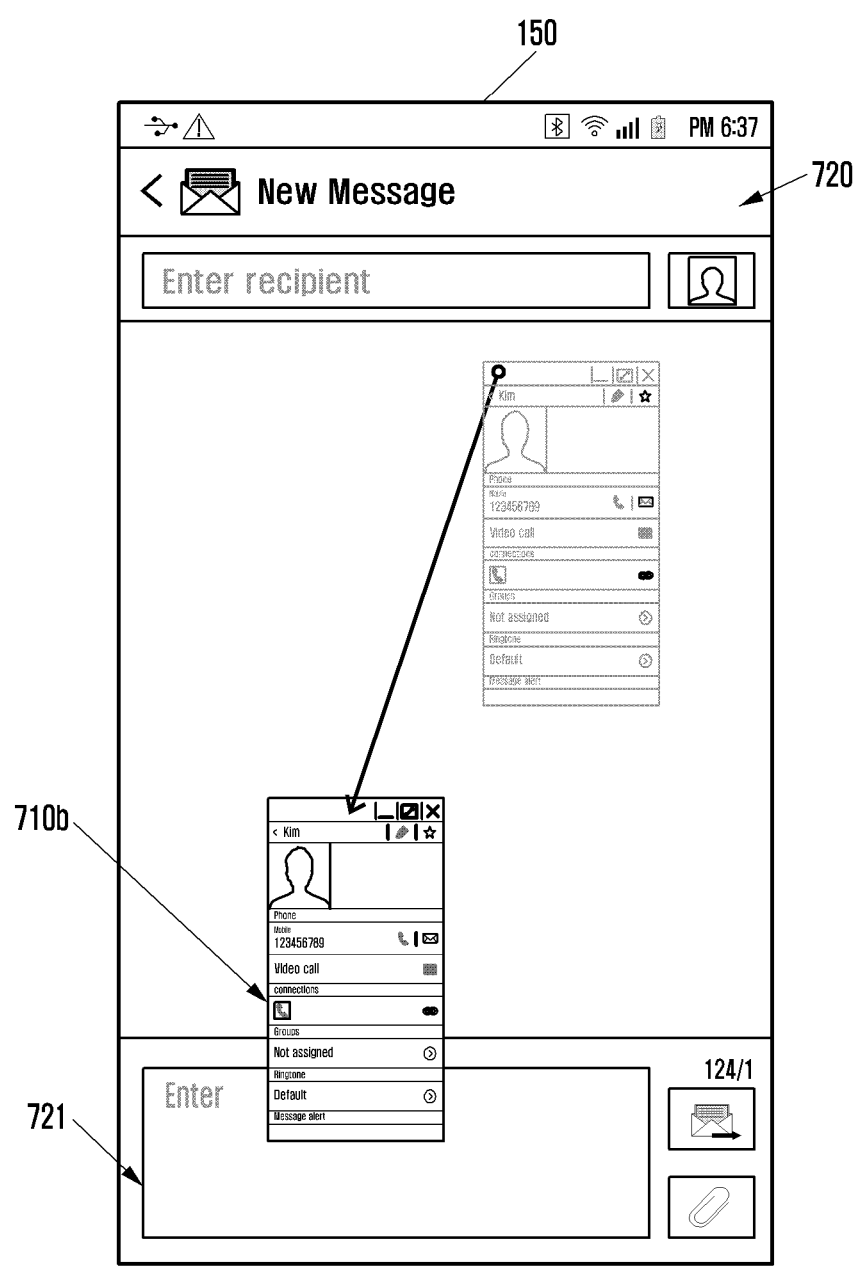
Figure 7C:
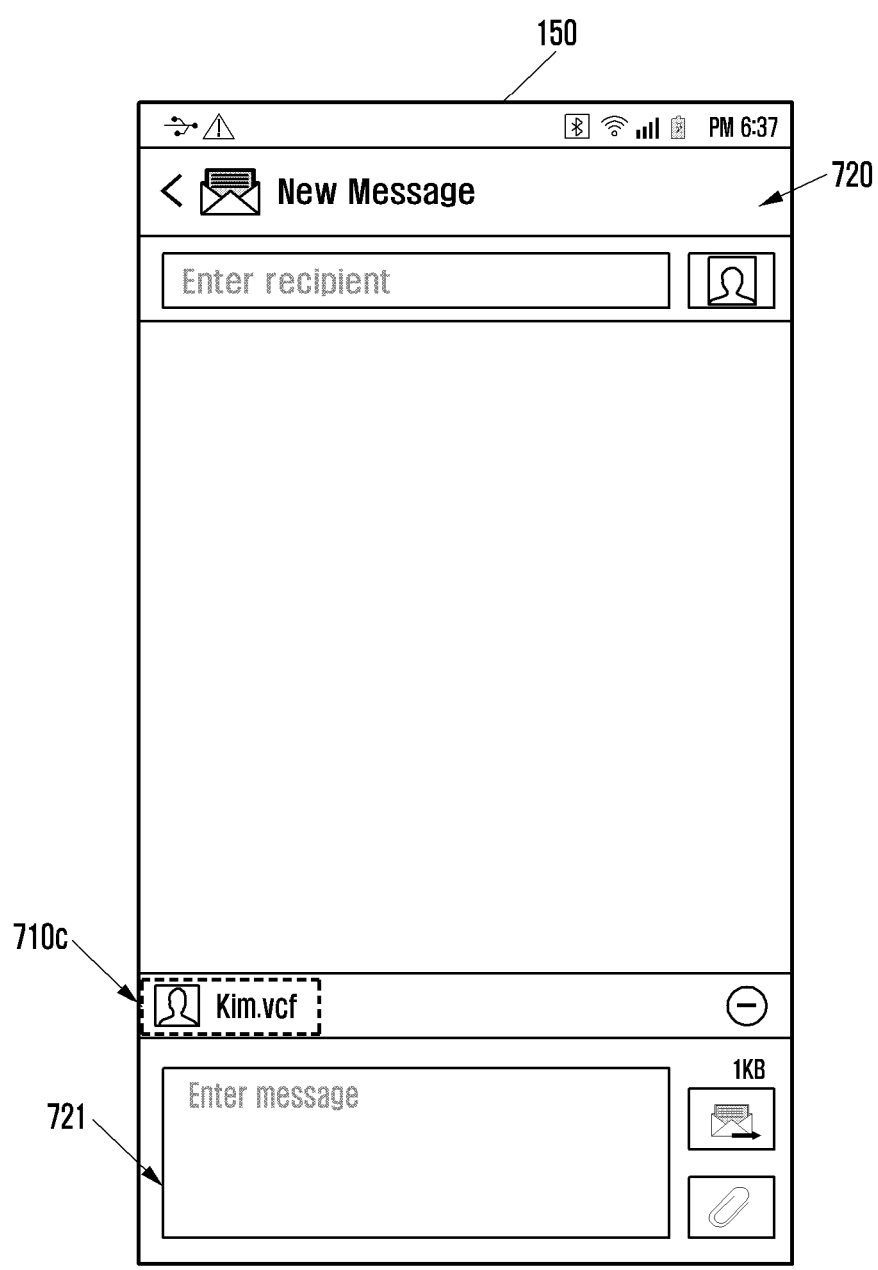

FIGS. 7A to 7C are screen example views illustrating a data transferal between applications of an electronic device according to an embodiment of the present disclosure.

Referring to FIG. 7A, the electronic device 101 may execute a message application and may display a message application window through the display 150. For example, the message application window may be a message write window 720 as shown in the drawings. The message write window 720 may include an input window 721 for a message writing. The electronic device 101 may execute a contact information application in a state in which the message application is executed, and for example, the electronic device 101 may overlay a contact information window 710*a* with the message write window 720 to display the contact information window 710*a*. A user may identify random contact information in the contact information window 710*a*. As shown in FIG. 7B, the user may shift the contact information window 710*b* to the input window 721 of the message write window 720. For example, when the display 150 is a touch screen, the user may drag the contact information window 710*b* to the input window 721 of the message write window 720. For example, while a drag input is provided, the electronic device 101 may display the contact information window 710*b* in a predetermined minimized size, which is shifted correspondingly to the drag input. Referring to FIG. 7C, the electronic device 101 may identify that the input window 721 is an attribute capable of receiving random processed data as an attached file, and may attach a file 710*c* which is processed from contact information corresponding to the contact information window 710*b* to a written message. When the file 710*c* which is processed from the contact information is attached, the electronic device 101 may end the contact information application or may minimize the contact information window to display the contact information window as a mini window.

Figure 8:
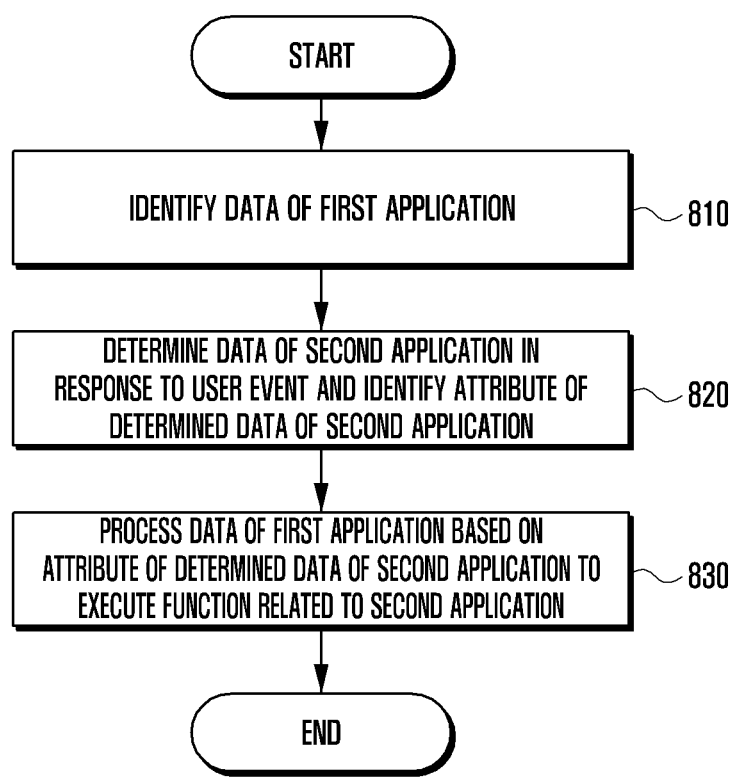
FIG. 8 is a flowchart illustrating a method of executing a function related to an application of an electronic device according to an embodiment of the present disclosure.

FIG. 8 is a flowchart illustrating a method of executing a function related to an application of an electronic device according to an embodiment of the present disclosure.

Referring to FIG. 8, in operation 810, the electronic device 101 may identify the data of the first application. For example, the electronic device 101 may execute the first application, and may generate various pieces of data in the executed first application. The pieces of data of the first application may be various contents or various formats. Alternatively, the electronic device 101 may execute the first application, and may identify only information of the first application, which is required to obtain the various pieces of data of the first application. For example, the electronic device 101 may not generate the various pieces of data of the first application in advance, and may generate only data of the first application corresponding to the attribute of the second application later.

In operation 820, the electronic device 101 may determine data of the second application in response to the user event, and may identify the attribute of the determined data of the second application. For example, the electronic device 101 may receive a user event which shifts the first application window to data displayed on the second application window. The electronic device 101 may identify the attribute (e.g., information included in the data) of the data.

In operation 830, the electronic device 101 may execute the function related to the second application using the data of the first application and based on the identified attribute of the data of the second application. For example, when the second application is a document editing application and the attribute of data of the second application, which is selected by the user event, is information a character font, the electronic device 101 may display a text included in the data of the first application on a document editing window of the document editing application in a character font size corresponding to the selected data.

Figure 9A:
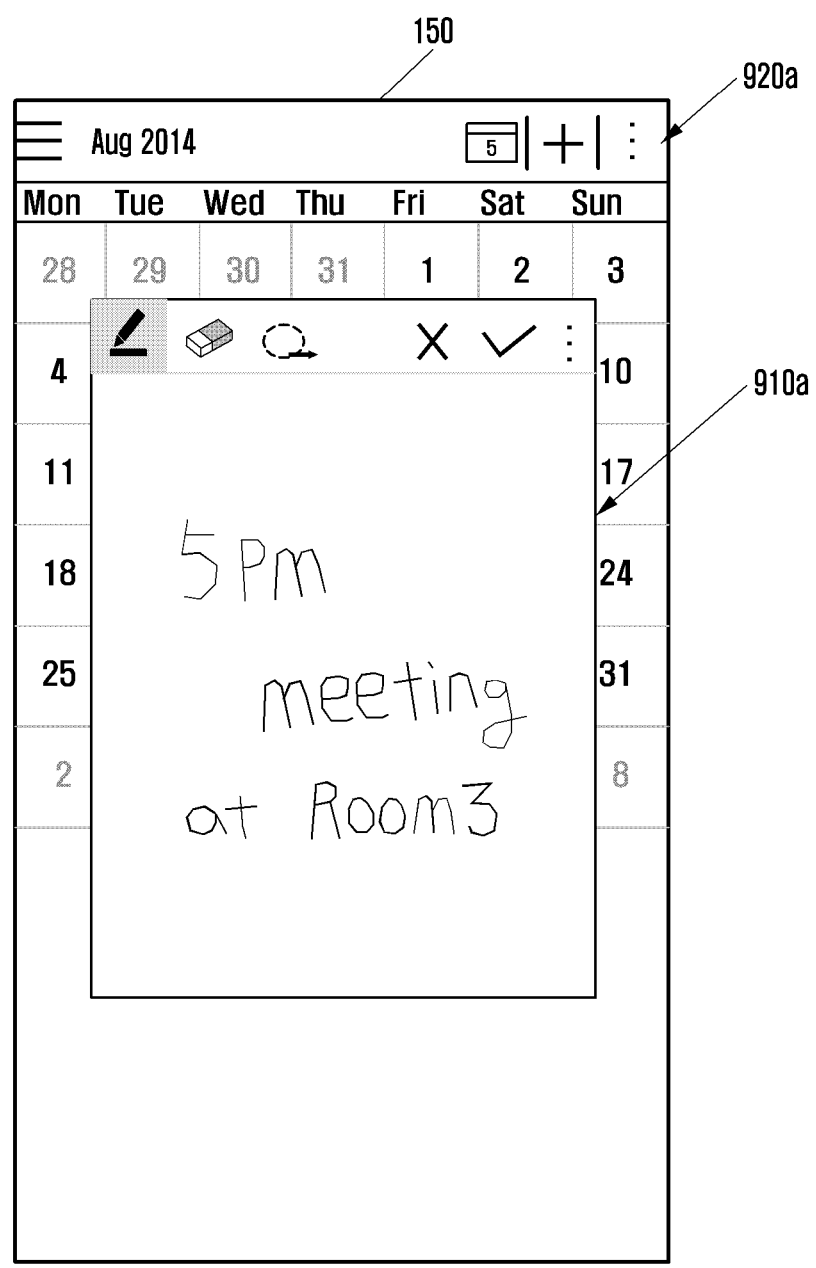
FIGS. 9A, 9B, and 9C are screen example views illustrating a method of executing a function related to an application of an electronic device according to an embodiment of the present disclosure.
Figure 9B:
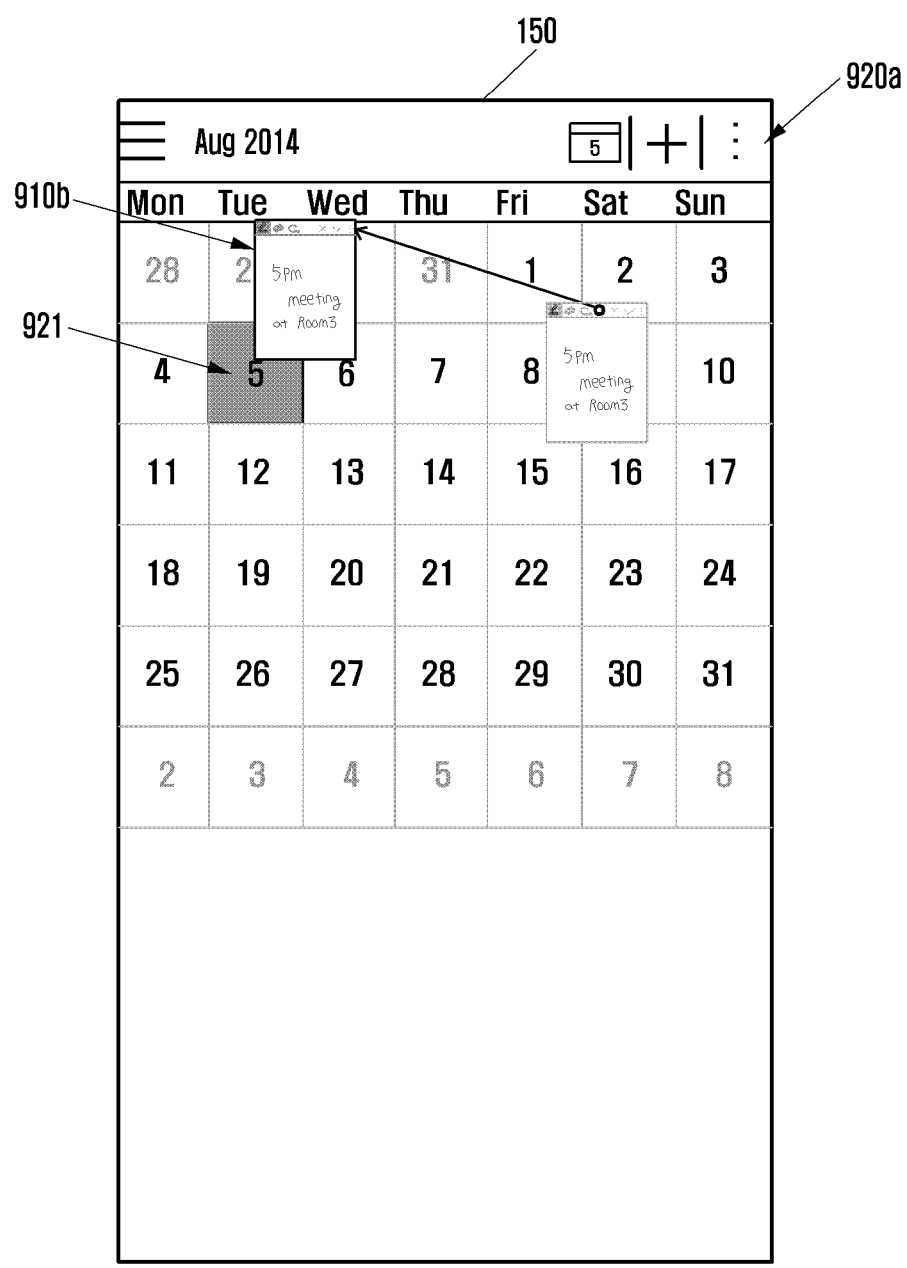
Figure 9C:
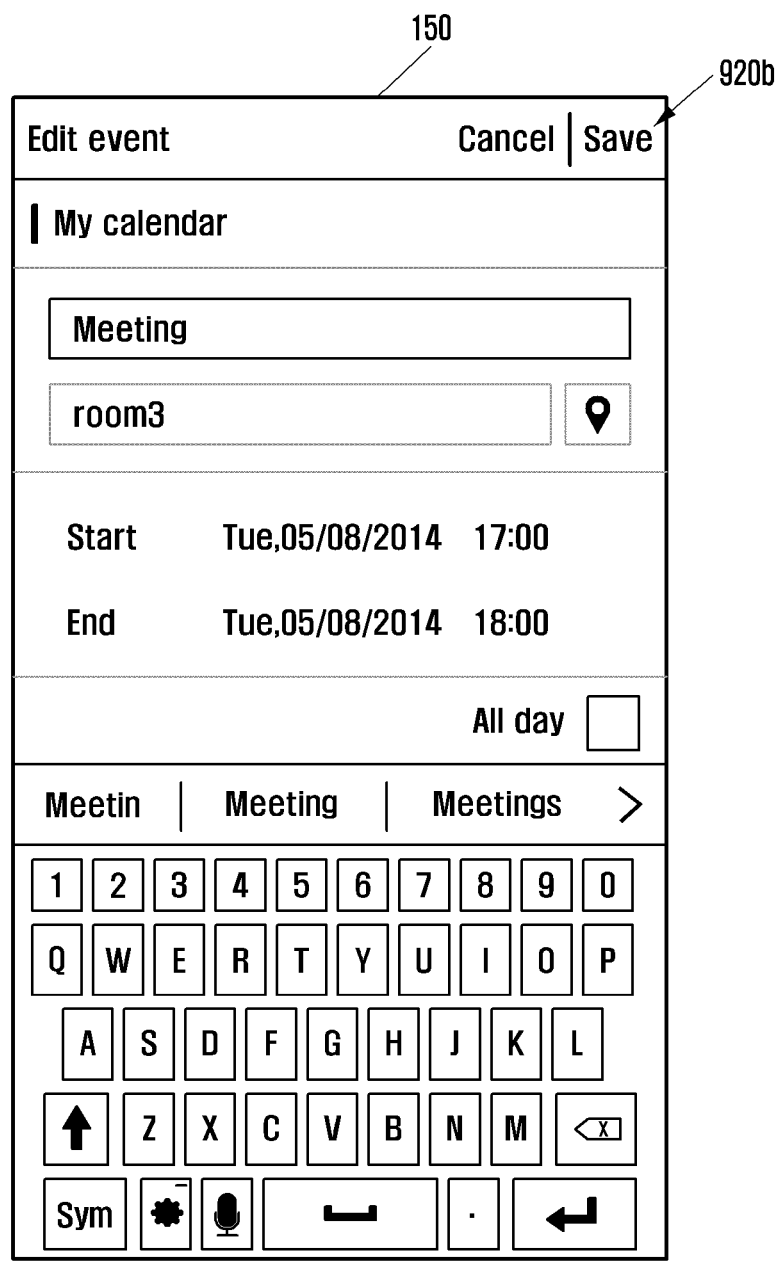

FIGS. 9A to 9C are screen example views illustrating a method of executing a function related to an application of an electronic device according to an embodiment of the present disclosure.

Referring to FIG. 9A, the electronic device 101 may execute a schedule application, and may display a schedule application window through the display 150. For example, the schedule application window may be a monthly schedule window 920a as shown in drawings. The monthly schedule window 920a may include date information of a corresponding month. The electronic device 101 may execute a memo application in a state in which the schedule application is executed. The electronic device 101 may overlay a memo write window 910a with the monthly schedule window 920a to display the memo write window 910a. A user may write a random memo in the memo write window 910a. For example, the memo may include time information, event information and place information. As shown in FIG. 9B, the user may shift the memo write window 910b to a random date 921 of the monthly schedule window 920a. For example, when the display 150 is a touch screen, the user may drag the memo write window 910b to the random date 921 of the monthly schedule window 920a. For example, while a drag input is provided, the electronic device 101 may display the memo write window 910b in a predetermined minimized size, which is shifted correspondingly to the drag input. Referring to FIG. 9C, the electronic device 101 may identify selected date information and extract a text having time information, event information and the place information of a memo text included in the memo write window 910b. In addition, the electronic device 101 may provide an interface 920b of the second application, which configures a schedule to the selected data using the extracted time information, the event information and the place information.

FIGS. 10A to 10D are screen example views illustrating a method of executing a function related to an application of an electronic device according to an embodiment of the present disclosure.

Figure 10A:
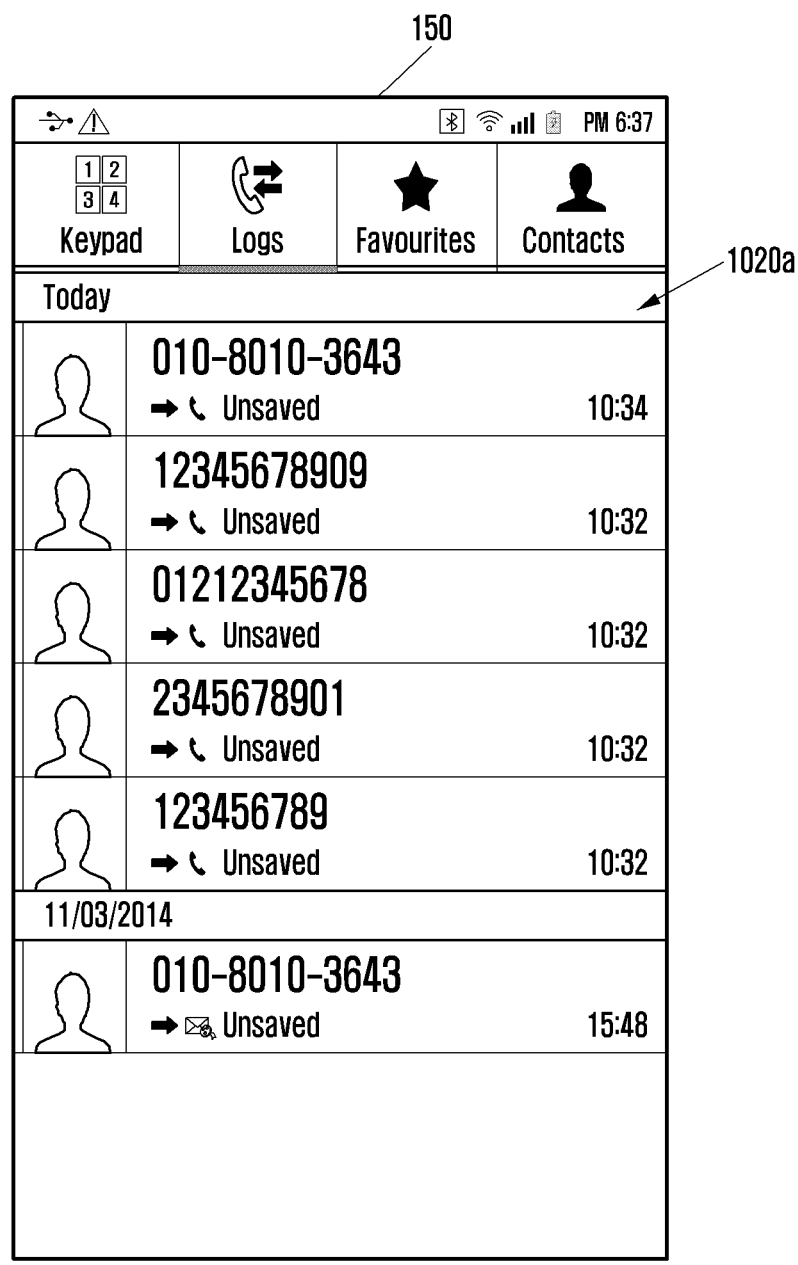
FIGS. 10A, 10B, 10C, and 10D are screen example views illustrating a method of executing a function related to an application of an electronic device according to an embodiment of the present disclosure.
Figure 10B:
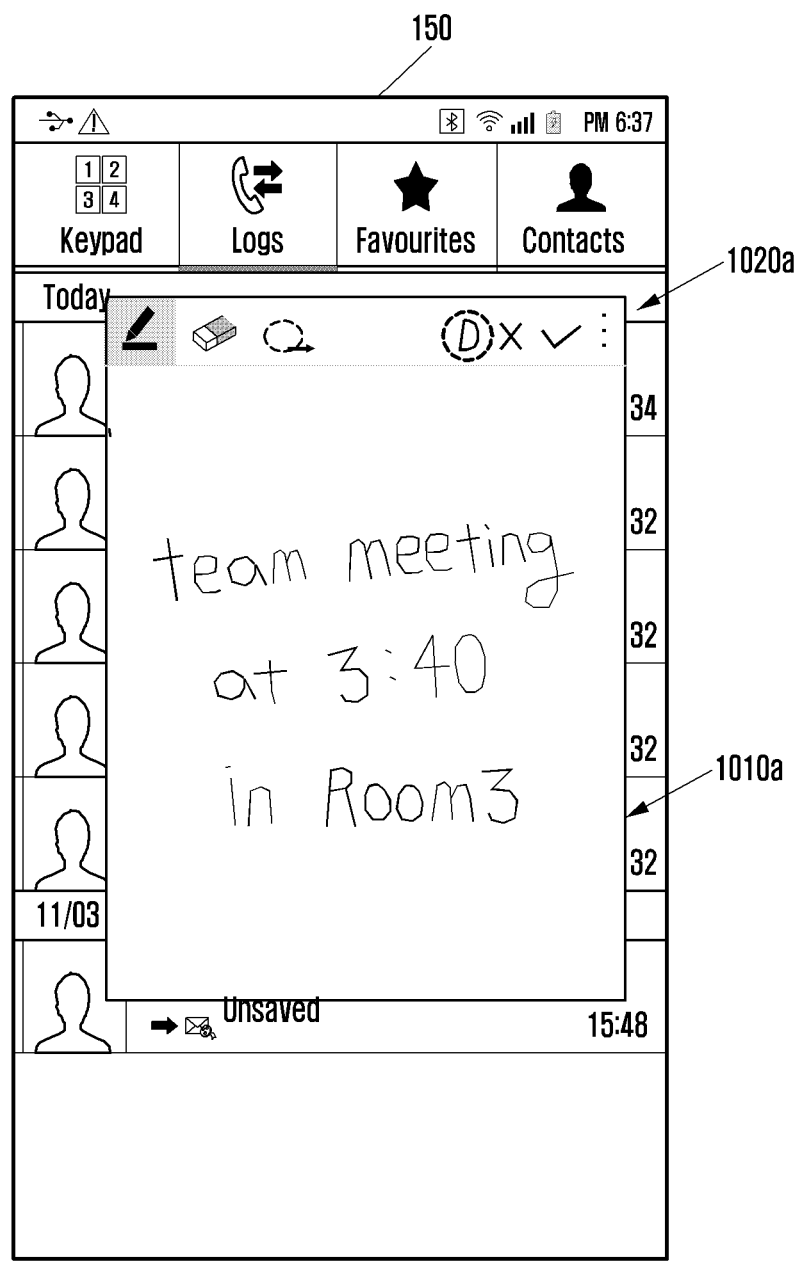
Figure 10C:
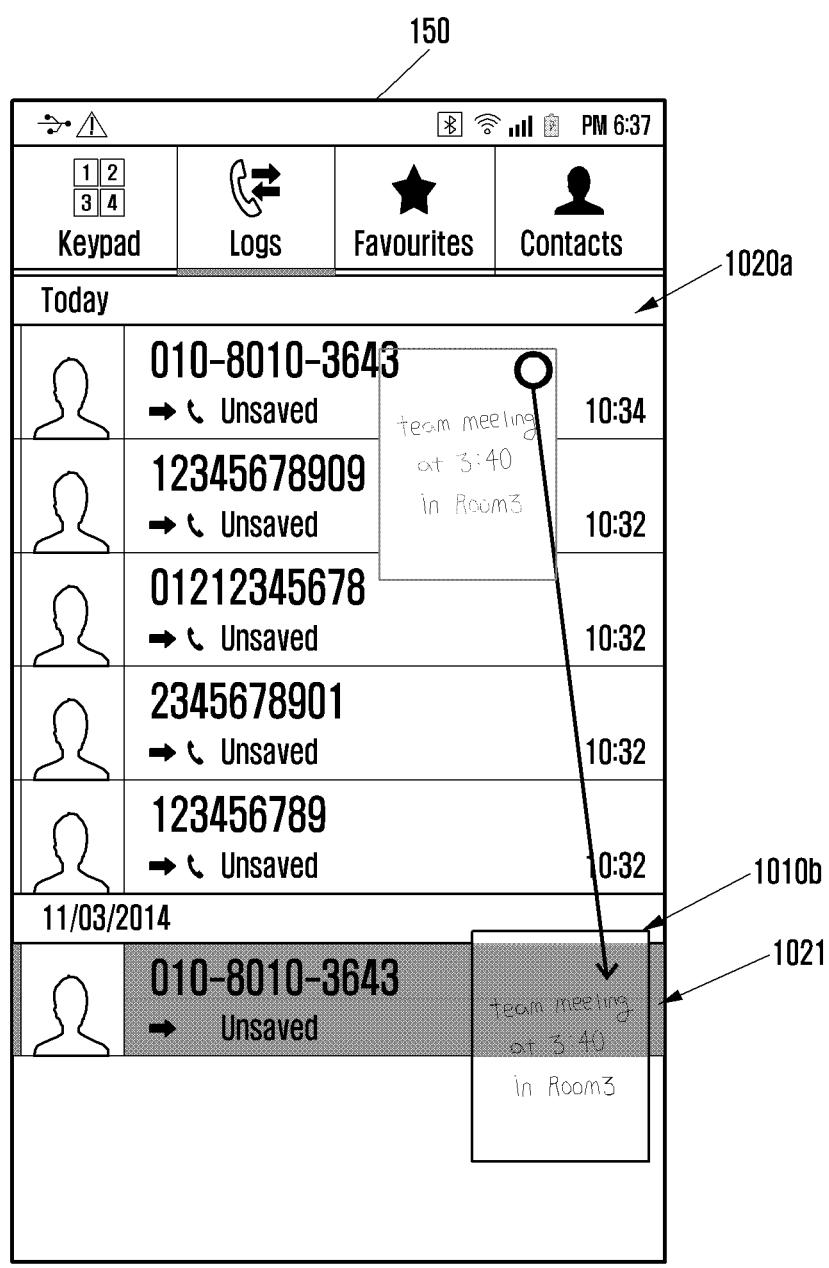
Figure 10D:
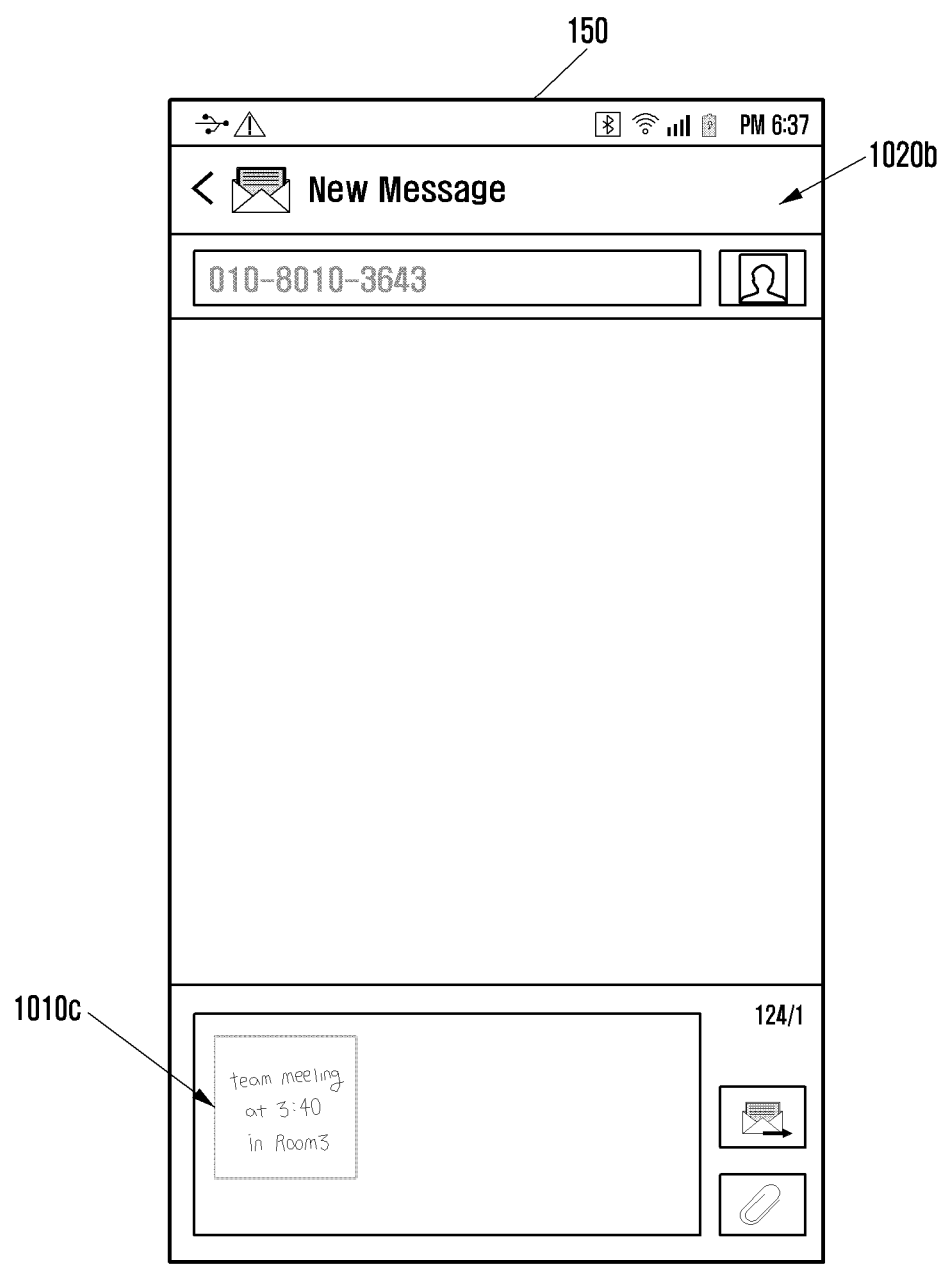

Referring to FIG. 10A, the electronic device 101 may execute a call application, and may display a call application window through the display 150. For example, the call application window may be a call record window 1020a as shown in drawings. The call record window 1020a may include telephone number information. Referring to FIG. 10B, the electronic device 101 may execute a memo application in a state in which the call application is executed. The electronic device 101 may overlay a memo write window 1010a with the call record window 1020a to display the memo write window 1010a. A user may write a random memo in the memo write window 1010a. As shown in FIG. 10C, the user may shift the memo write window 1010b to a random telephone number 1021 of the call record window 1020a. For example, when the display 150 is a touch screen, the user may drag the memo write window 1010b to the random telephone number 1021 of the call record window 1020a. For example, while a drag input is provided, the electronic device 101 may display the memo write window 1010b in a predetermined minimized size, which is shifted correspondingly to the drag input. Referring to FIG. 10D, the electronic device 101 may identify selected telephone number information and extract a memo text included in the memo write window 1010b or a thumbnail image 1010c of the memo write window. In addition the electronic device 101 may provide an interface 1020b of a message application which transmits the memo text or the thumbnail image 1010c extracted by the selected telephone number.

Figure 11:
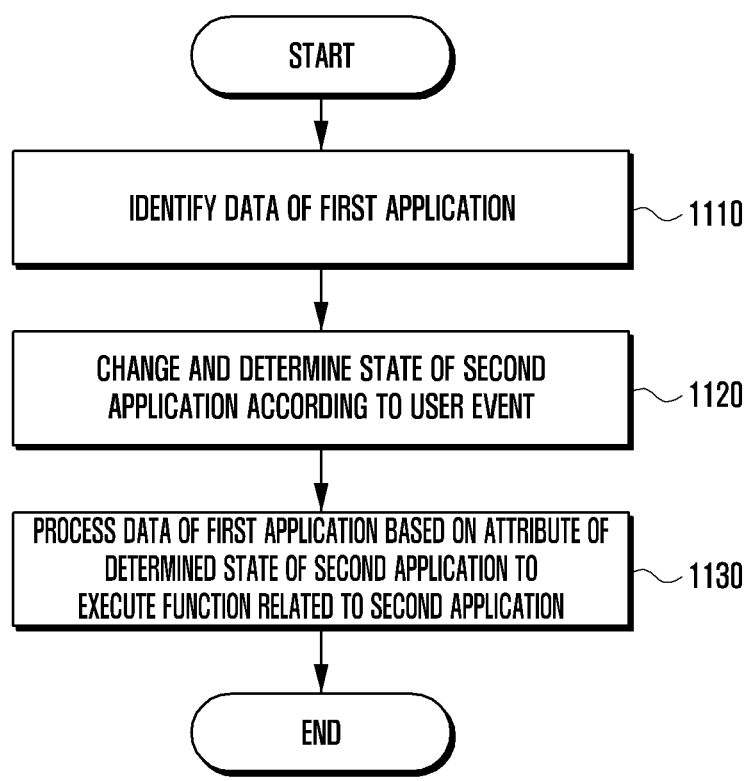
FIG. 11 is a flowchart illustrating a method of executing a function related to an application of an electronic device according to an embodiment of the present disclosure.

FIG. 11 is a flowchart illustrating a method of executing a function related to an application of an electronic device according to an embodiment of the present disclosure.

Referring to FIG. 11, in operation 1110, the electronic device 101 may identify the data of the first application. For example, the electronic device 101 may execute the first application, and may generate various pieces of data in the executed first application. The pieces of data of the first application may be various contents or various formats. Alternatively, the electronic device 101 may execute the first application, and may identify only information of the first application, which is required to obtain the various pieces of data of the first application. For example, the electronic device 101 may not generate the various pieces of data of the first application in advance, and may generate only data of the first application corresponding to the attribute of the second application later.

In operation 1120, the electronic device 101 may determine the second application in response to the user event. In addition, the electronic device 101 may change and determine the state of the second application, for example, a mode of the second application, an output screen configuration and the like, according to the user event. For example, the electronic device 101 may receive a user event which shifts the first application window to the second application window. The electronic device 101 may change the mode, e.g., from an output mode to an editing mode, of the second application, in response to the shifting of the first application window corresponding to the user event.

In operation 1130, the electronic device 101 may execute the function related to the second application using the data of the first application and based on the determined attribute of the state of the second application. For example, when the second application is a memo application and it enters an editing mode of the memo application according to the user event, the electronic device 101 may attach a text included in the data of the first application to the memo application as a memo.

Figure 12A:
FIGS. 12A, 12B, and 12C are screen example views illustrating a method of executing a function related to an application of an electronic device according to an embodiment of the present disclosure.
Figure 12B:
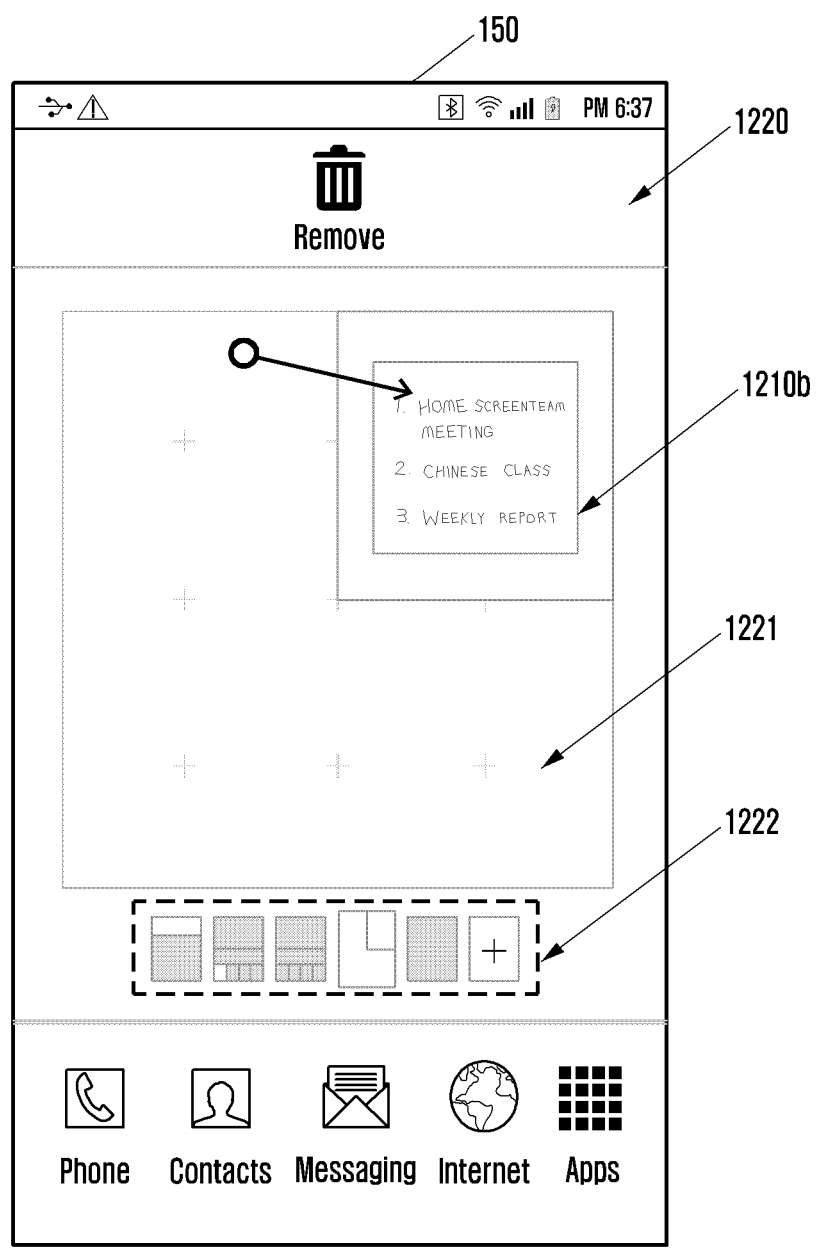
Figure 12C:
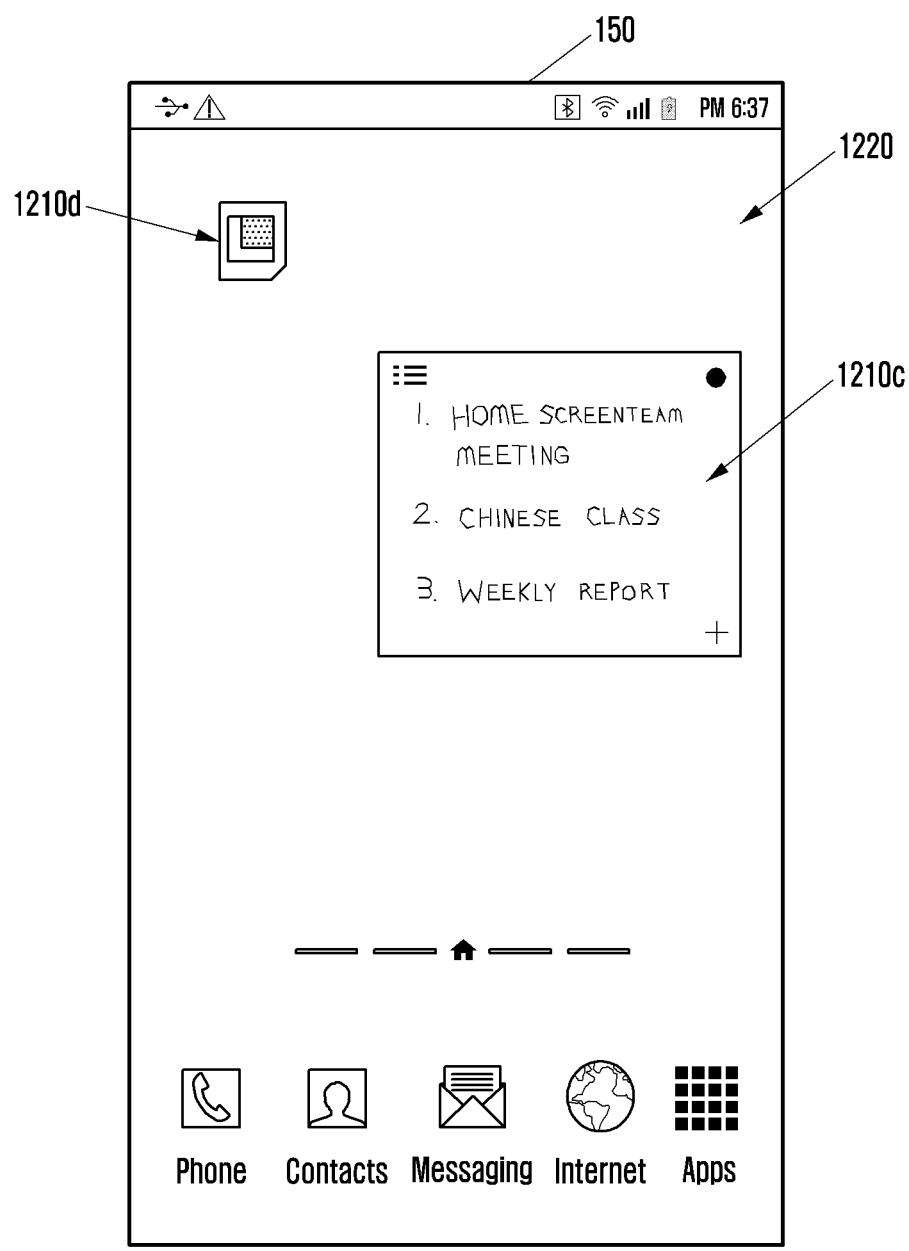

FIGS. 12A to 12C are screen example views illustrating a method of executing a function related to an application of an electronic device according to an embodiment of the present disclosure.

Referring to FIG. 12A, the electronic device 101 may execute a memo application in a state in which a home screen 1220 is output through the display 150. In addition, the electronic device 101 may overlay a memo write window 1210a with the home screen 1220 to display the memo write window 1210a. The home screen 1220 is a screen displayed by an execution of a home screen application, and may include an object such as an application icon or a widget. A user may write a random memo in the memo write window 1210a. As shown in FIG. 12B, the user may shift the memo write window 1210b in the home screen 1220. For example, when the display 150 is a touch screen, the user may drag the memo write window 1210b in a predetermined area of the home screen 1220. The home screen application may enter a home screen layout arrangement mode in response to a drag input. For example, when the home screen application enters the home screen layout arrangement mode, the home screen application may display an arrangement area 1221 on the home screen 1220. In addition, the home screen application may provide a layout list 1222 on the home screen 1220. The home screen application may distinguish and display a layout selected in response to the drag input of the user. For example, the electronic device may display the memo write window 1210*b* which is shifted correspondingly to the drag input in a predetermined minimized size. The memo write window 1210*b* may be suitably displayed correspondingly to the selected layout in the arrangement area 1221. As shown in FIG. 12C, the electronic device 101 may generate a widget 1210*c* of the memo write window in a position where the drag input is released, correspondingly to the selected layout. When the drag input is released, the electronic device 101 may transfer the generated widget 1210*c* and a selected layout value to the home screen application and may switch it to a home screen state. When the drag input is released, the electronic device 101 may end the memo application or minimize the memo write window to display the memo write window as a mini window 1210*d*.

Figure 13:
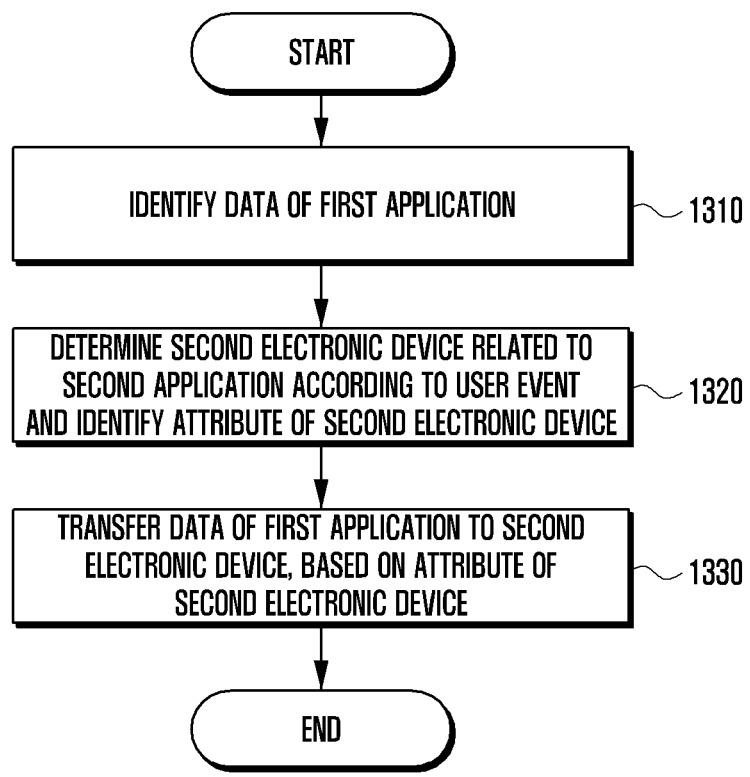
FIG. 13 is a flowchart illustrating a method of transferring data of an electronic device according to an embodiment of the present disclosure.

FIG. 13 is a flowchart illustrating a method of transferring data of an electronic device according to an embodiment of the present disclosure.

Referring to FIG. 13, in operation 1310, the electronic device 101 may identify the data of the first application. For example, the electronic device 101 may execute the first application, and may generate various pieces of data in the executed first application. The pieces of data of the first application may be various contents or various formats. Alternatively, the electronic device 101 may execute the first application, and may identify only information of the first application, which is required to obtain the various pieces of data of the first application. For example, the electronic device 101 may not generate the various pieces of data of the first application in advance, and may generate only data of the first application corresponding to the attribute of the second application later.

In operation 1320, the electronic device 101 may determine at least one second electronic device among at least one second electronic device related to the second application in response to the user event. For example, the electronic device 101 may identify the second electronic device sharing a printer by executing a printer application, and may provide a user event which shifts the first application window to information of at least one second electronic device among the second electronic devices included in an application window. The electronic device 101 may determine at least one second electronic device in response to the user event, and may identify an attribute of the determined electronic device, e.g., at least one of network information, resolution information, processor performance information or position information of the selected electronic device. The information of the selected electronic device may be stored in the electronic device 101 or may be received from the selected electronic device.

In operation 1330, the electronic device 101 may transfer the data of the first application to the selected electronic device based on the attribute of the selected electronic device. For example, when the first application is a photo album application and a user drags an application window in which the user is outputting a random picture to random information of the second electronic device sharing the printer included in the printer application, a picture file may be transmitted to the selected second electronic device. At this time, for example, a resolution of the picture file may be adjusted and transmitted based on the resolution information of the selected second electronic device.

Figure 14A:
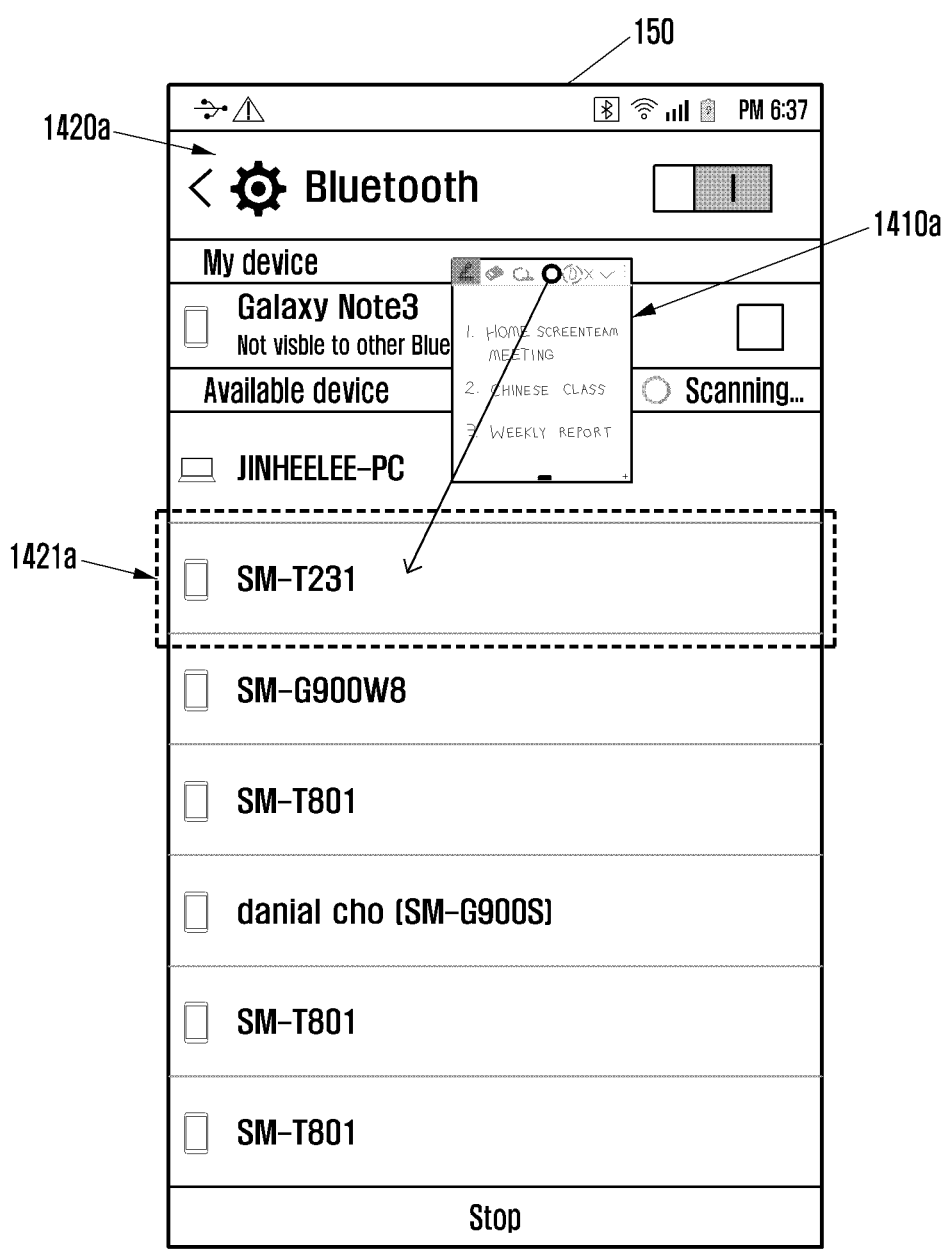
FIGS. 14A, 14B, and 14C are screen example views illustrating a method of transferring data of an electronic device according to an embodiment of the present disclosure.
Figure 14B:
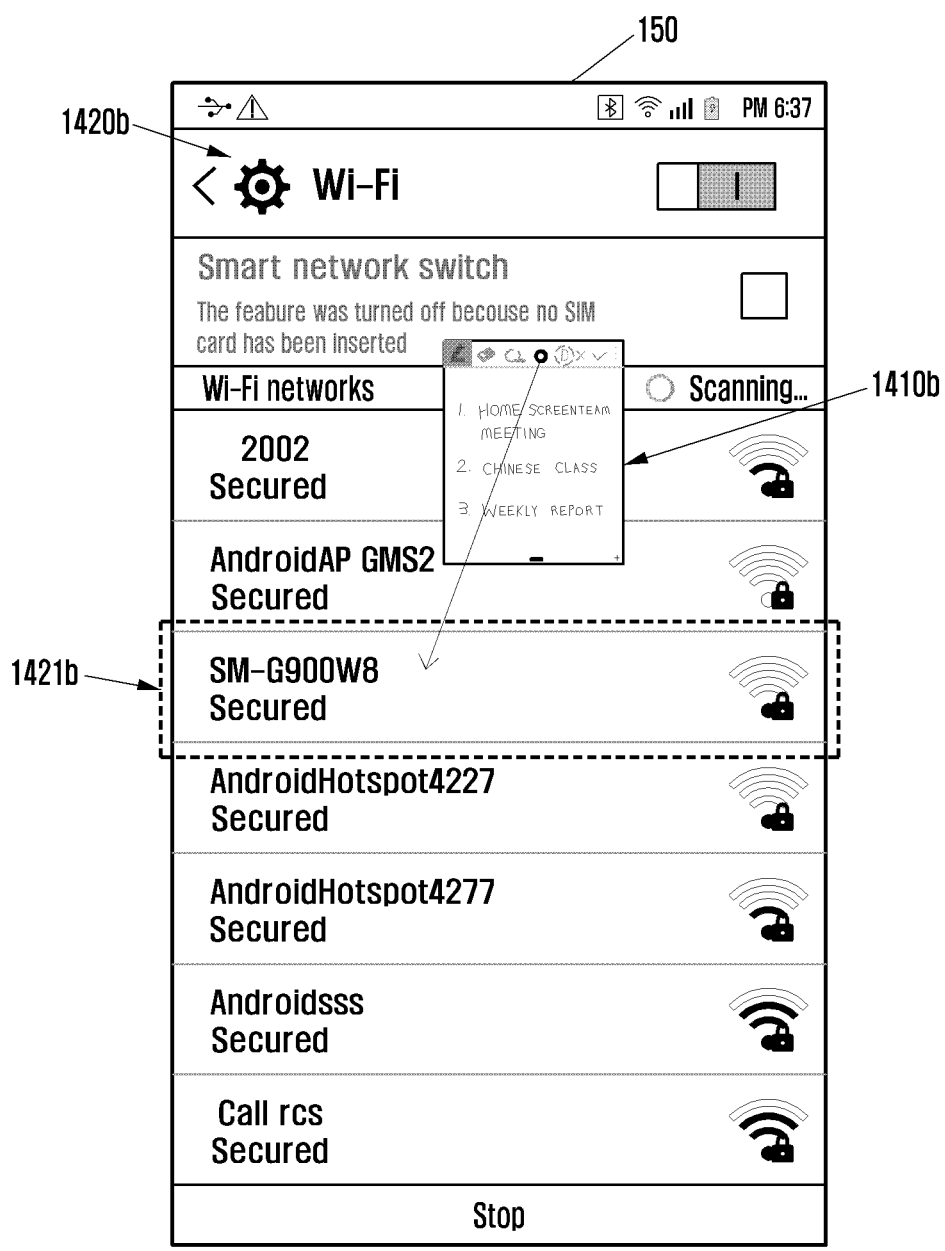
Figure 14C:
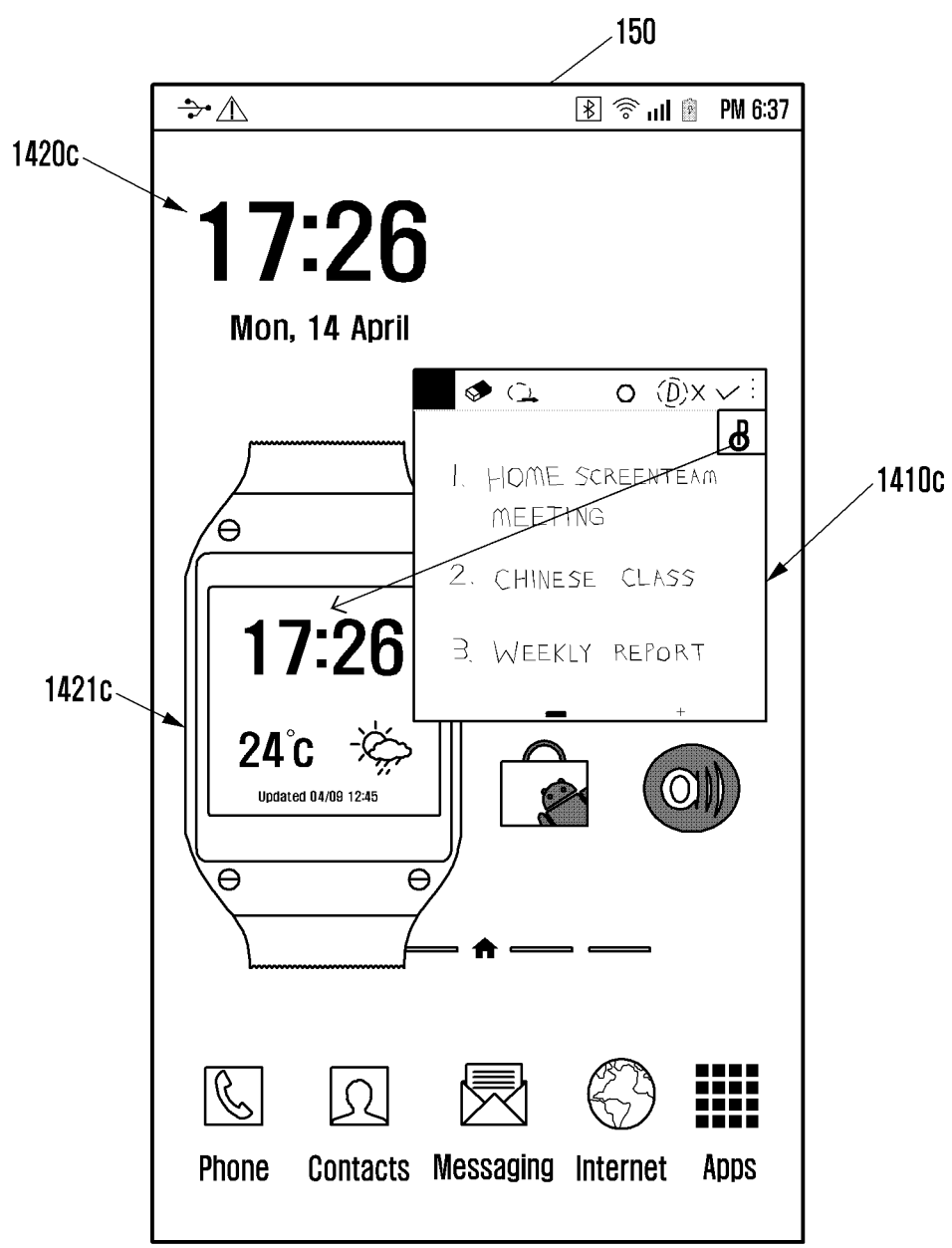

FIGS. 14A to 14C are screen example views illustrating a method of transferring data of an electronic device according to an embodiment of the present disclosure.

Referring to FIGS. 14A and 14B, the electronic device 101 may execute a network application, and may display a network information window through the display 150. For example, the network information window may be a bluetooth information window 1420*a* or a Wi-Fi information window as shown in drawings. The bluetooth information window 1420*a* may include information on an electronic device connected through bluetooth and the Wi-Fi information window 1420*b* may include information on an electronic device connected through Wi-Fi. The electronic device 101 may execute a memo application in a state in which the network application is executed, and may overlay memo write windows 1410*a* and 1410*b* with the bluetooth information window 1420*a* or the Wi-Fi information window 1420*b* to display the memo write windows 1410*a* and 1410*b*. The user may write a random memo in the memo write windows 1410*a* and 1410*b*. The user may shift the memo write windows 1410*a* and 1410*b* to random electronic device information 1421*a* and 1421*b* of the bluetooth information window 1420*a* or the Wi-Fi information window 1420*b*. For example, when the display 150 is a touch screen, the user may drag the memo write windows 1410*a* and 1410*b* to the random electronic device information 1421*a* and 1421*b* of the bluetooth information window 1420*a* or the Wi-Fi information window 1420*b*. For example, while a drag input is provided, the electronic device 101 may display the memo write windows 1410*a* and 1410*b* in a predetermined minimized size, which is shifted correspondingly to the drag input. The electronic device 101 may identify the attribute of the selected electronic device, e.g., network information such as a network bandwidth, data transmission cost and a network connection signal intensity. The electronic device 101 may determine and transfer an amount of a memo text or a size of a memo file of the memo write windows 1410*a* and 1410*b* based on the identified network information to the selected electronic device.

Referring to FIG. 14C, the electronic device 101 may execute a memo application in a state in which a home screen 1420*c* is output, and may overlay the memo write window 1410*c* with the home screen 1420*c* to display the memo write window 1410*c*. The home screen 1420*c* is a screen displayed by an execution of a home screen application, and may include an object such as an application icon or a widget. In an embodiment, the home screen 1420*c* may further include an object 1421*c* of a wearable device connected to the electronic device 101 through a short range communication. A user may write a random memo in the memo write window 1410*c*. The user may shift the memo write window 1410*a* to the object 1421*c* of the wearable device. For example, when the display 150 is a touch screen, the user may drag the memo write window 1410*c* to the object 1421*c* of the wearable device. For example, while a drag input is provided, the electronic device 101 may display the memo write window 1410*c* and 1410*b* in a predetermined minimized size, which is shifted correspondingly to the drag input. The electronic device 101 may identify an attribute of the wearable device, e.g., network information or resolution information. The electronic device 101 may determine an amount of a memo text, a size of a memo file and the like based on the identified network information or the resolution information and may transfer data of the memo write window 1410*c* to the wearable device. As an embodiment, a push button P may be included in the memo write window 1410*c*, and when the push button P is selected and dragged to the object 1421*c* of the wearable device, the data of the memo write window 1410*c* may be transferred to the wearable device.

Figure 15:
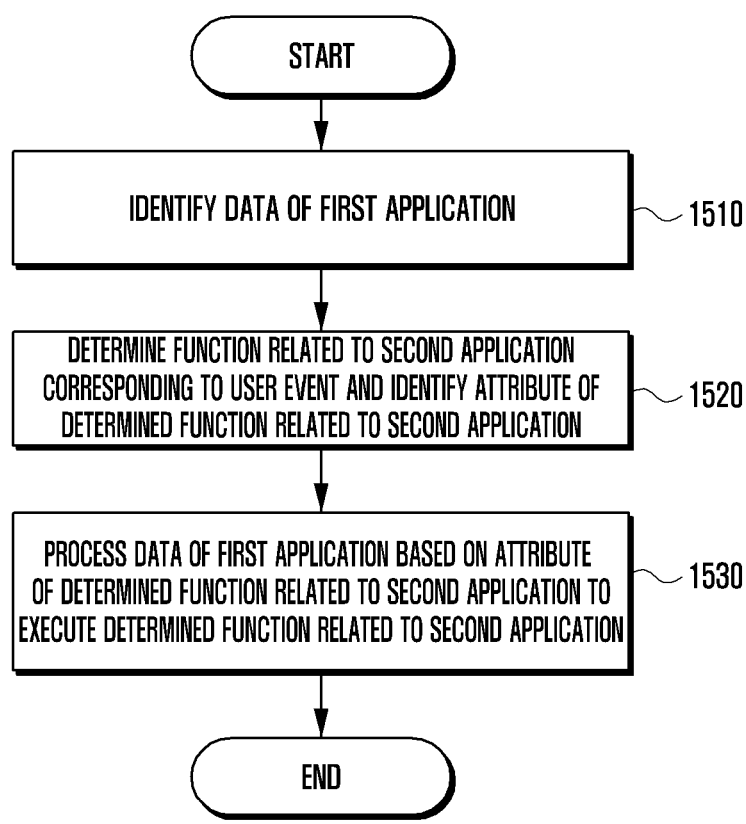
FIG. 15 is a flowchart illustrating a method of executing a function related to an application of an electronic device according to an embodiment of the present disclosure.

FIG. 15 is a flowchart illustrating a method of executing a function related to an application of an electronic device according to an embodiment of the present disclosure.

Referring to FIG. 15, in operation 1510, the electronic device 101 may identify the data of the first application. For example, the electronic device 101 may execute the first application, and may generate various pieces of data in the executed first application. The pieces of data of the first application may be various contents or various formats. Alternatively, the electronic device 101 may execute the first application, and may identify only information of the first application, which is required to obtain the various pieces of data of the first application. For example, the electronic device 101 may not generate the various pieces of data of the first application in advance, and may generate only data of the first application corresponding to the attribute of the second application later.

In operation 1520, the electronic device 101 may determine the function related to the second application in response to the user event and may identify the attribute of the determined function related to the second application. For example, the electronic device 101 may receive a user event which shifts the first application window to a search application icon. The electronic device 101 may execute a search engine in response to the user event and may identify information on an instruction of a performance of the search function.

In operation 1530, the electronic device 101 may execute the function related to the second application using the data of the first application and based on the attribute of the function related to the selected second application. For example, when the electronic device 101 executes the search engine in response to the user event and identifies the information on the instruction of the performance of the search function, the electronic device 101 may perform a search through a search word based on a text included in the data of the first application.

Figure 16A:
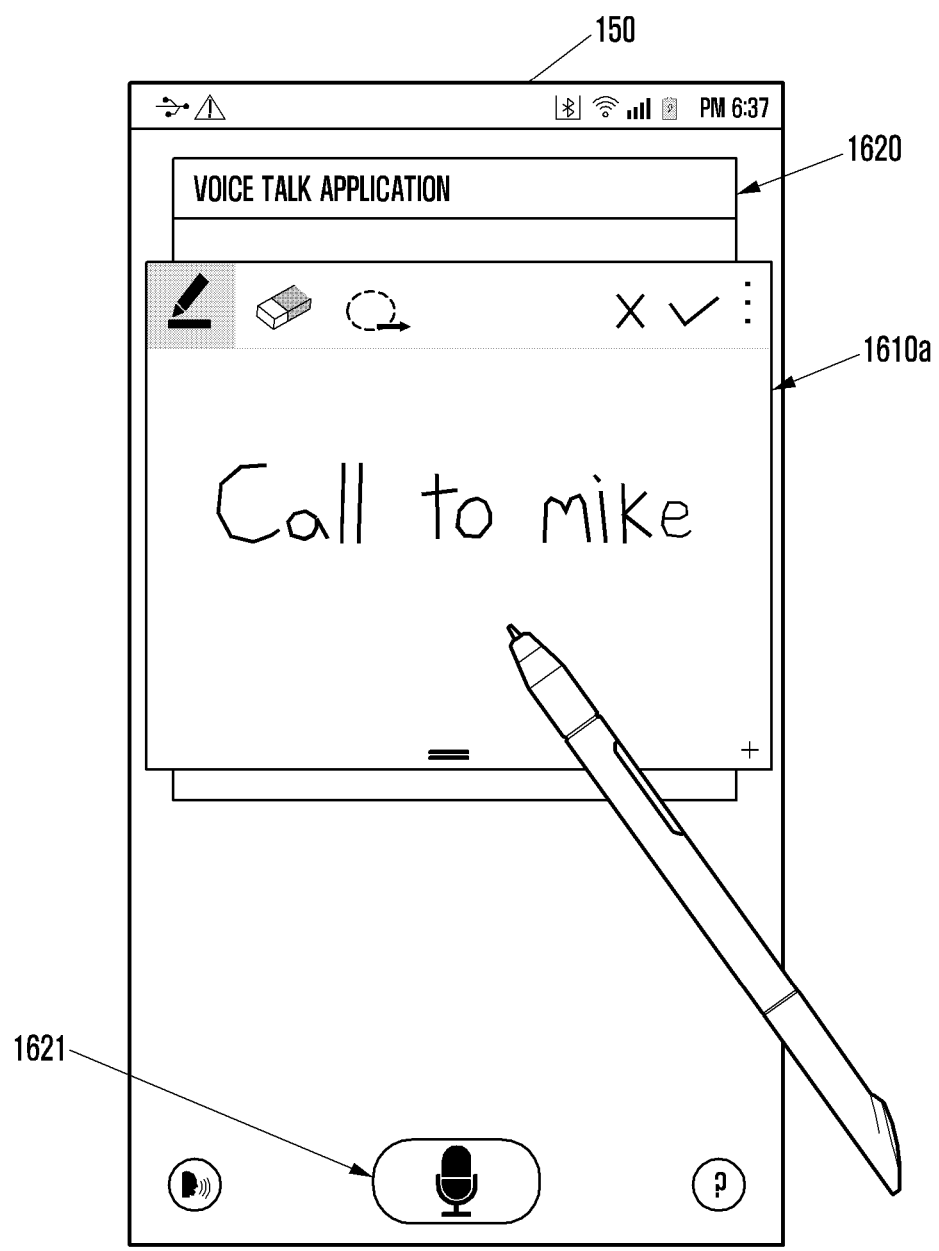
FIGS. 16A, 16B, and 16C are screen example views illustrating a method of executing a function related to an application of an electronic device according to an embodiment of the present disclosure.
Figure 16B:
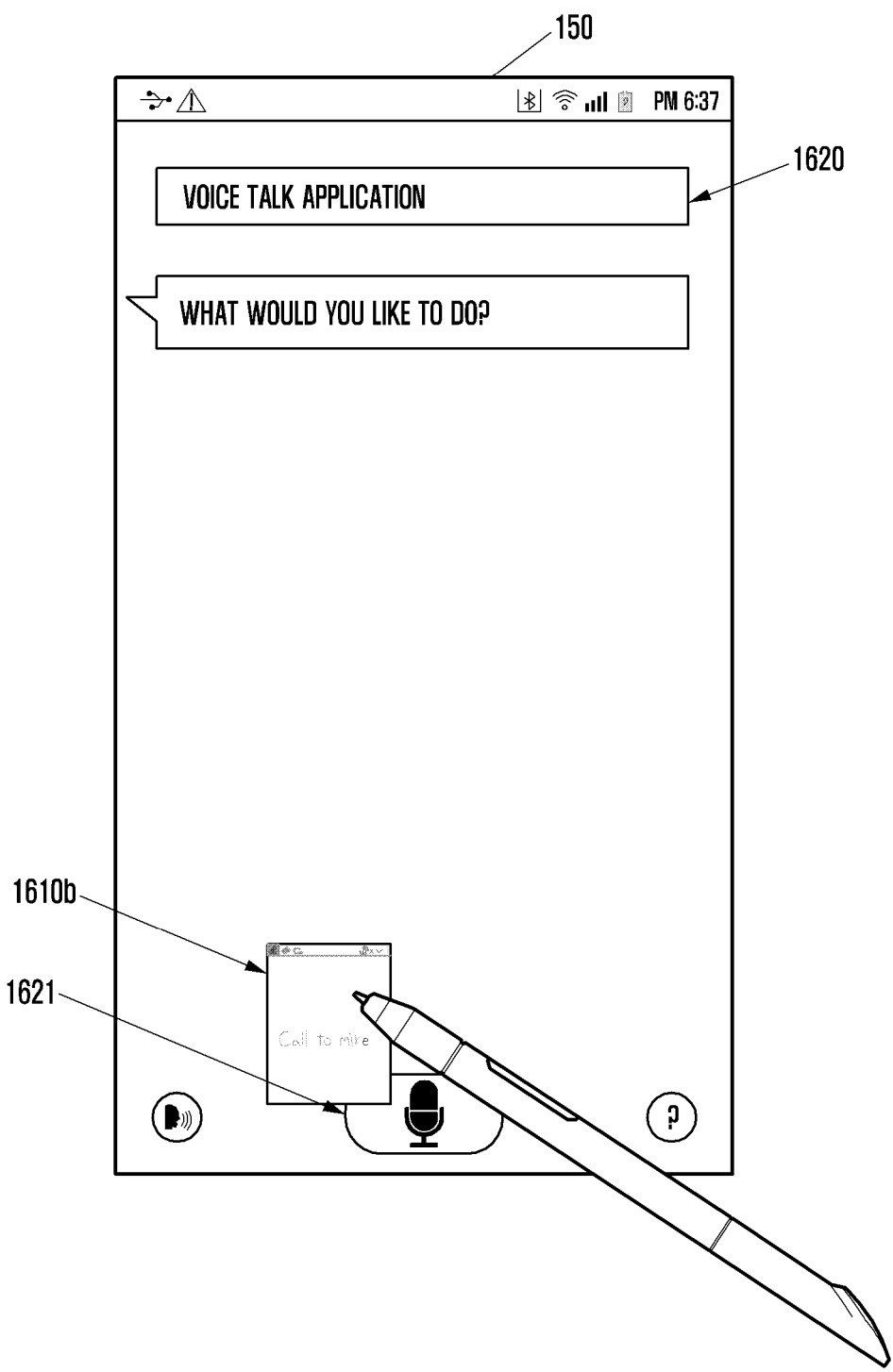
Figure 16C:
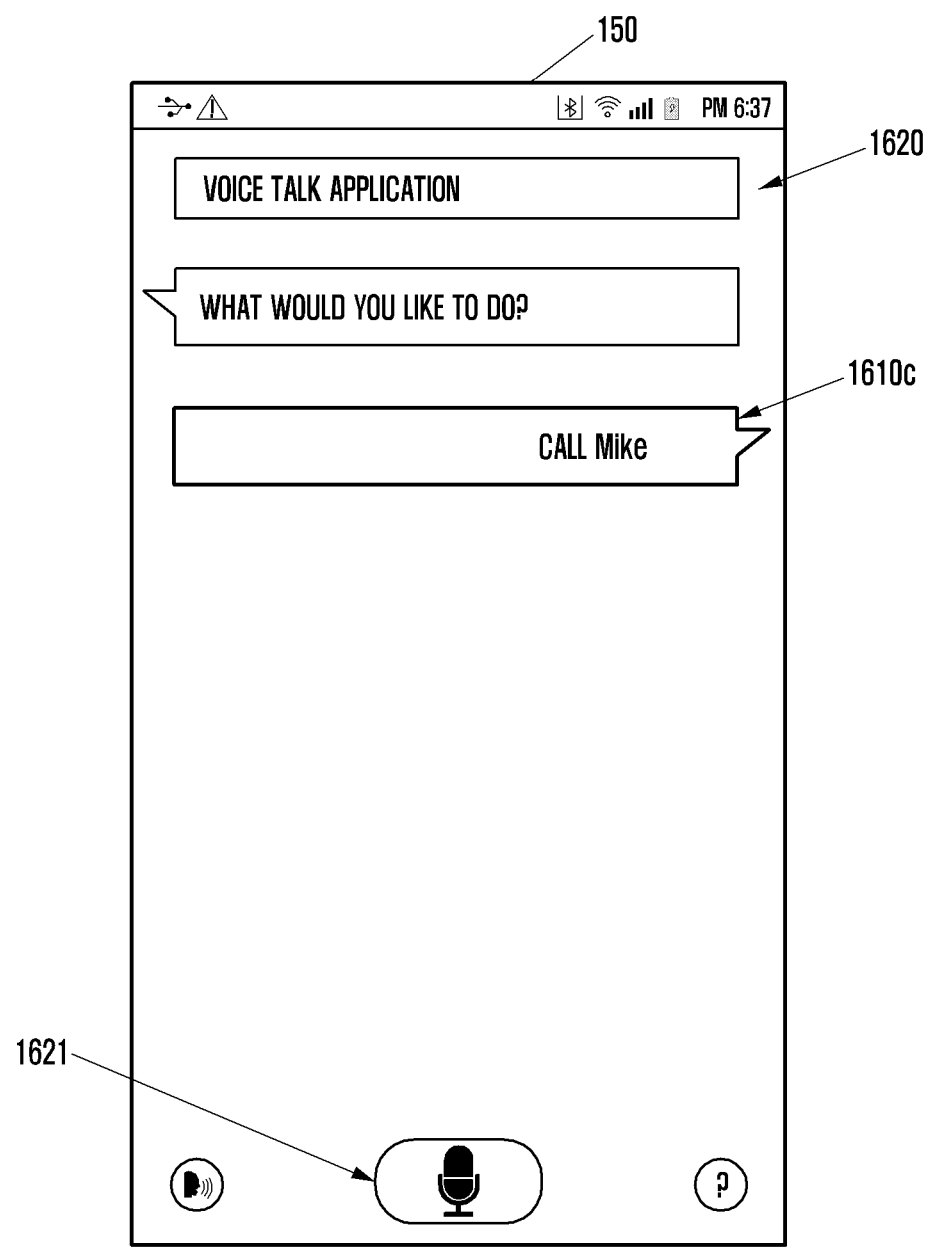

FIGS. 16A to 16C are screen example views illustrating a method of executing a function related to an application of an electronic device according to an embodiment of the present disclosure.

Referring to FIG. 16A, the electronic device 101 may execute a voice talk application, and may display a voice talk window 1620 through the display 150. For example, the voice talk window 1620 may include a voice input button 1621 instructing a voice input start. The electronic device 101 may execute a memo application in a state in which the voice talk application is executed, and may overlay a memo write window 1610a with the voice talk window 1620 to display the memo write window 1610a. The user may write a random memo in the memo write window 1610a. As shown in FIG. 16B, a user may shift the memo write window 1610b to the voice input button 1621 of the voice talk window 1620. For example, when the display 150 is a touch screen, the user may drag the memo write window 1610b to the voice input button 1621 of the voice talk window 1620. For example, while a drag input is provided, the electronic device 101 may display the memo write window 1610b in a predetermined minimized size, which is shifted correspondingly to the drag input. Referring to FIG. 16C, the electronic device 101 may identify information on a start of a voice input reception in response to the drag input, and may convert a memo text included in the memo write window 1610b into a voice input format to detect the memo text as a voice input. The electronic device 101 may display the detected voice input in a predetermined area 1610c of the voice talk window 1620 as a text.

Figure 17A:
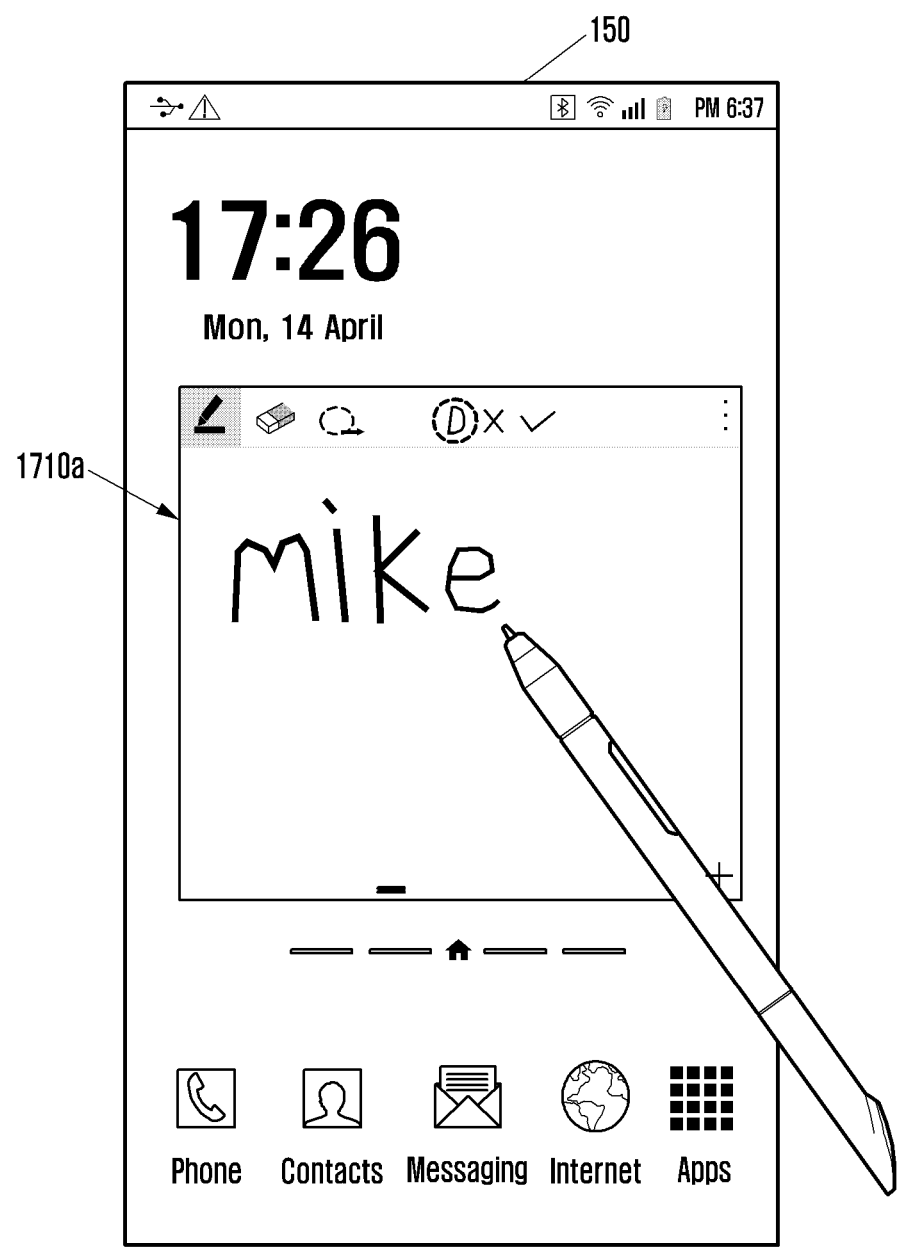
FIGS. 17A and 17B are screen example views illustrating a method of executing a function related to an application of an electronic device according to an embodiment of the present disclosure.
Figure 17B:
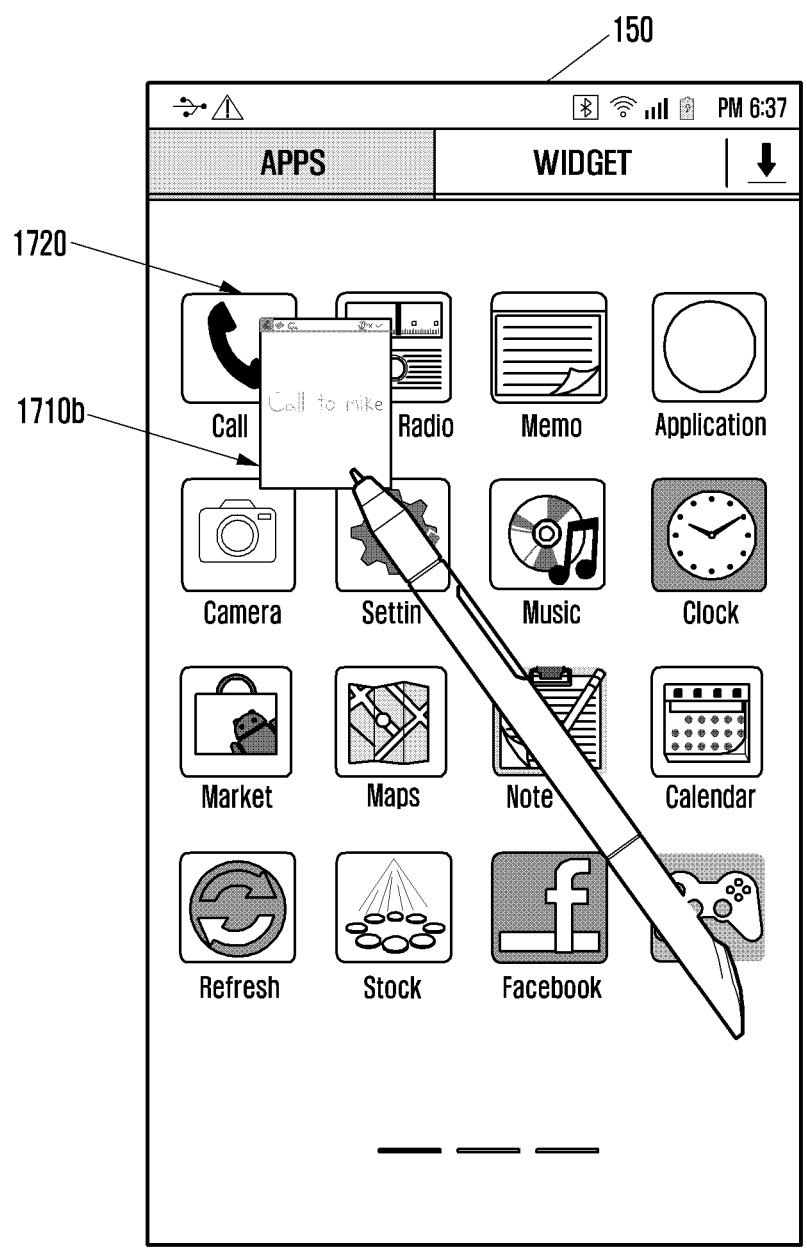

FIGS. 17A and 17B are screen example views illustrating a method of executing a function related to an application of an electronic device according to an embodiment of the present disclosure.

Referring to FIG. 17A, the electronic device 101 may execute a memo application, and may display a memo write window 1710a through the display 150. A user may write a random memo in the memo write window 1710a. As shown in FIG. 17B, the user may shift the memo write window 1710b to a random icon, e.g., a telephone application icon 1720, among application icons displayed on a home screen. For example, when the display 150 is a touch screen, the user may drag the memo write window 1710b to the telephone application icon 1720 on the home screen. For example, while a drag input is provided, the electronic device 101 may display the memo write window 1710b in a predetermined minimized size, which is shifted correspondingly to the drag input. The electronic device 101 may identify telephone call function execution information in response to the drag input, and may search for contact information corresponding to a memo text included in the memo write window 1710b to execute a telephone call to the searched contact information.

Figure 18A:
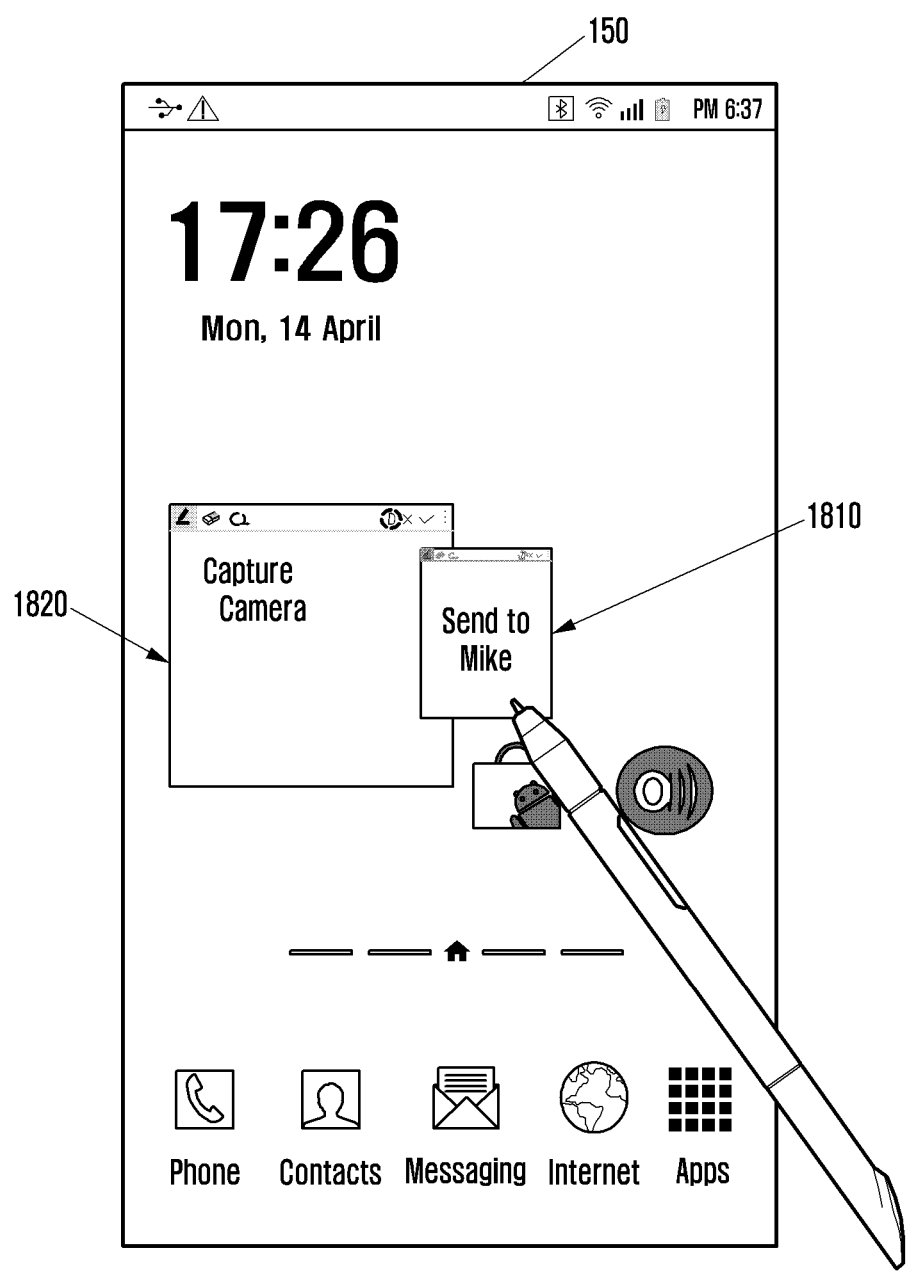
FIGS. 18A and 18B are screen example views illustrating a method of merging data between applications of an electronic device according to an embodiment of the present disclosure.
Figure 18B:
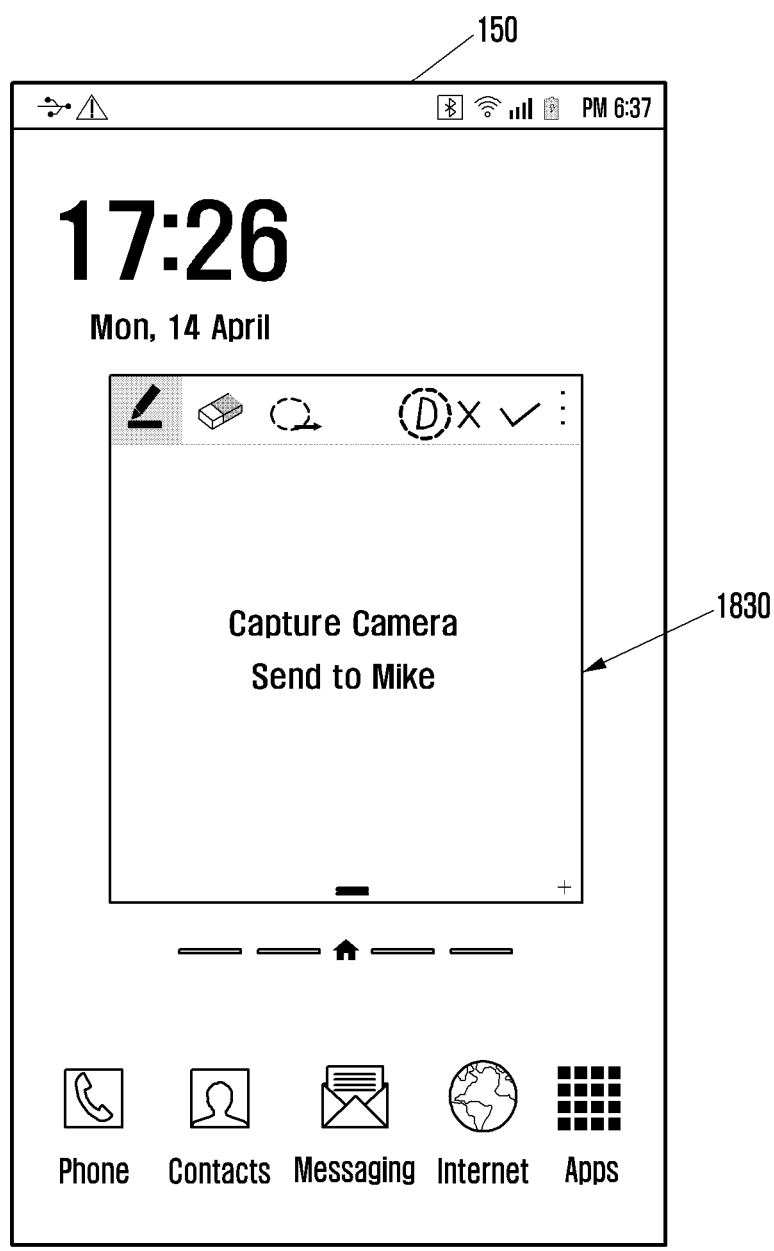

FIGS. 18A and 18B are screen example views illustrating a method of merging data between applications of an electronic device according to an embodiment of the present disclosure.

The present embodiment describes an example of a data merger between the same applications. Referring to FIG. 18A, the electronic device 101 may execute a memo application and may output a first memo write window 1810 through the display 150. A user may write a random memo in the first memo write window 1810. In addition, the user may further execute a second memo write window 1820 to write a random memo in the second memo write window 1820. The user may shift the first memo write window 1810 to the second memo write window 1820. For example, when the display 150 is a touch screen, the user may drag the first memo write window 1810 to the second memo write window 1820. For example, while a drag input is provided, the electronic device 101 may display the first memo write window 1810 in a predetermined minimized size, which is shifted correspondingly to the drag input. Referring to FIG. 18B, the electronic device 101 may identify a selection of the memo application by the drag input, and may transfer a memo text included in the first memo write window 1810 to the second memo write window 1820 based on an attribute of the identified memo application. The second memo write window 1830 may merge and display the existing memo with the memo transferred from the first memo write window 1810. According to an amount of the merged memo, the size of the second memo write window 1830 may be changed. When the memo text of the first memo write window 1810 is transferred to the second memo write window 1830, the electronic device 101 may end the first memo write window 1810 or may display the first memo write window 1810 as a mini window.

A method of executing a function of an electronic device according to an embodiment of the present disclosure may include identifying data of a first application, determining at least one second application in response to a user event and identifying an attribute of each of the second applications, and processing the data of the first application based on the attributes of the each of the second applications to execute a function related to at least one second application.

The determining of at least one second application in response to the user event according to an embodiment of the present disclosure may include receiving the user event which shifts a window of the first application to a random position of a window of at least one executed second application, and displaying the window of the first application correspondingly to the user event.

The identifying of the attributes of each second application according to an embodiment of the present disclosure may include at least one of determining a sub-window of the second application in response to the user event and identifying an attribute of the sub-window of the second application, determining data of the second application in response to the user event and identifying an attribute of the data of the second application, determining the function related to the second application in response to the user event and identifying an attribute of the function related to the second application, changing a state attribute of the second application according to the user event, or determining at least one second electronic device related to the second application according to the user event and identifying each attribute of at least one second electronic device.

The executing of the function related to at least one second application according to an embodiment of the present disclosure may include at least one of, transferring the data of the first application to the second application in a format determined based on the attribute of the sub-window of the second application, processing the data of the first application to execute the function related to the second application, based on the attribute of the data of the second application, changing a format of the data of the first application based on the attribute of the function related to the second application to execute the function related to the second application, processing the data of the first application to execute the function related to the second application, based on the state attribute of the second application, or transferring the data of the first application to at least one second electronic device, based on an attribute of at least one second electronic device.

The processing of the data of the first application based on the attribute of the second application according to an embodiment of the present disclosure may include processing the identified data as at least one of a thumbnail image, a text obtained by an OCR, raw data, processed data, a link, or effective information, based on the attribute of the second application.

The identifying of the data of the first application according to an embodiment of the present disclosure may include generating the data of the first application as a thumbnail image, a text obtained by an OCR, raw data, processed data, a link or effective information.

The processing of the data of the first application based on the attribute of each second application according to an embodiment of the present disclosure may include selecting the data of the first application corresponding to the attribute of the second application, among the generated data of the first application.

The processing of the data of the first application to execute the function related to at least one second application according to an embodiment of the present disclosure may include determining the attribute of the transferred data of the first application based on an attribute of the user event, and the attribute of the transferred data of the first application may include at least one of an amount, a size, a brightness or a maintenance time of the transferred data.

The method of executing the function of the electronic device according to an embodiment of the present disclosure may further include at least one of, when the data of the first application is processed and the function related to the second application is executed, ending the execution of the first application, when a selection input for the data of the first application is provided from the function related to the executed second application, re-executing the first application, or when the data of the re-executed first application is changed, reflecting the changed data to the function related to the executed second application.

The identifying of the attribute of at least one second electronic device determined according to the user event according to an embodiment of the present disclosure may include identifying at least one of network information, resolution information, processor performance information or position information of at least one second electronic device.

The determining of at least one second application in response to the user event according to an embodiment of the present disclosure may include determining at least one second application among the executed applications, based on an execution state attribute of the executed applications, and the execution state attribute of the applications may include at least one of information on whether the application is being executed or is in an execution standby state, information on whether the application is loaded on an execution history or a memory, information on whether the application is scheduled to be executed by a configuration of a timer and the like, information on whether the application is connected to a second electronic device connected to communicate through a network, or information on whether an interrupt is registered.

The "module" used in various embodiments of the present disclosure may refer to, for example, a "unit" including one of hardware, software, and firmware, or a combination of two or more of the hardware, software, and firmware. The "module" may be interchangeable with a term, such as a unit, a logic, a logical block, a component, or a circuit. The "module" may be a minimum unit of an integrated component element or a part thereof. The "module" may be a minimum unit for performing one or more functions or a part thereof. The "module" may be mechanically or electronically implemented. For example, the "module" according to various embodiments of the present disclosure may include at least one of an application-specific integrated circuit (ASIC) chip, a field-programmable gate array (FPGA), and a programmable-logic device for performing certain operations, which are now known or will be developed in the future.

At least some of the devices (e.g., modules or functions thereof) or methods (e.g., operations) according to various embodiments of the present disclosure may be implemented by, for example, by a command stored in a computer-readable storage medium in the form of a programming module. When the instruction is performed by at least one processor (for example, the processor 120), the at least one processor may perform a function corresponding to the instruction. The computer-readable storage medium may be, for example, the memory 130. At least some of the programming modules may be implemented (for example, executed) by, for example, the processor 120. At least a part of the programming module may, for example, include a module, a program, a routine, a set of instructions, or a process for performing at least one function.

The computer readable recording medium may include magnetic media such as a hard disc, a floppy disc, and a magnetic tape, optical media such as a compact disc read only memory (CD-ROM) and a DVD, magneto-optical media such as a floptical disk, and hardware devices specifically configured to store and execute program commands, such as a ROM, a random access memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

According to various embodiments of the present disclosure, in a storage medium storing instructions, the instructions are configured to perform at least one operation by at least one processor when the instructions are executed by at least one processor. At least one operation may include monitoring a generation of an event satisfying a predetermined condition, selecting another electronic device when the generation of the event satisfying the predetermined condition is detected, and generating work environment information of an application to transmit the work environment information to the selected other electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of executing a function of an electronic device, the method comprising:
   identifying, by the electronic device, data of a first application;
   determining, by the electronic device, an application having an execution state attribute corresponding to a user event as at least one second application, in response to the user event;
   identifying, by the electronic device, an attribute of each of the at least one second application;
   changing, by the electronic device, a state of the at least one second application according to the user event;
   changing, by the electronic device, a format of the data of the first application based on the attributes of the each of the at least one second application; and
   executing, by the electronic device, a function related to the at least one second application using the changed data and based on the attributes of the at least one second application,
   wherein the changing of the state includes changing of a mode of the at least one second application.

2. The method of claim 1, wherein the determining of the at least one second application in response to the user event comprises:
   receiving the user event which shifts a window of the first application to a random position of a window of at least one executed second application; and
   displaying the window of the first application correspondingly to the user event.

3. The method of claim 1, wherein the identifying of the attributes of each of the at least one second application comprises at least one of:
   determining a sub-window of the at least one second application in response to the user event and identifying an attribute of the sub-window of the at least one second application;
   determining data of the at least one second application in response to the user event and identifying an attribute of the data of the at least one second application;
   determining the function related to the at least one second application in response to the user event and identifying an attribute of the function related to the at least one second application;
   changing a state attribute of the at least one second application according to the user event; or
   determining at least one second electronic device related to the at least one second application according to the user event and identifying each attribute of at least one second electronic device.

4. The method of claim 3, wherein the executing of the function related to the at least one second application comprises at least one of:
   transferring the data of the first application to the at least one second application in a format determined based on the attribute of the sub-window of the at least one second application;
   processing the data of the first application to execute the function related to the at least one second application, based on the attribute of the data of the at least one second application;
   changing a format of the data of the first application based on the attribute of the function related to the at least one second application to execute the function related to the at least one second application;
   processing the data of the first application to executing the function related to the at least one second application, based on the state attribute of the at least one second application; or
   transferring the data of the first application to at least one second electronic device, based on an attribute of at least one second electronic device.

5. The method of claim 1, wherein the changing of the format of the data of the first application comprises processing the identified data as at least one of a thumbnail image, a text obtained by an optical character recognition (OCR), raw data, processed data, a link, or effective information, based on the attribute of the at least one second application.

6. The method of claim 1, wherein the identifying of the data of the first application comprises generating the data of the first application as a thumbnail image, a text obtained by an OCR, raw data, processed data, a link or effective information.

7. The method of claim 6, wherein the changing of the format of the data of the first application comprises selecting the data of the first application corresponding to the attribute of the at least one second application, among the generated data of the first application.

8. The method of claim 1,
   wherein the changing of the format of the data of the first application comprises determining an attribute of the transferred data of the first application based on an attribute of the user event, and
   wherein the attribute of the transferred data of the first application includes at least one of an amount, a size, a brightness or a maintenance time of the transferred data.

9. The method of claim 1, further comprising at least one of:
- when the format of the data of the first application is changed and the function related to the at least one second application is executed, ending the execution of the first application;
- when a selection input for the data of the first application is provided from the function related to the executed at least one second application, re-executing the first application; or
- when the data from the re-executing of the first application is changed, reflecting the changed data to the function related to the executed at least one second application.

10. The method of claim 3, wherein the identifying of the attribute of at least one second electronic device determined according to the user event comprises identifying at least one of network information, resolution information, processor performance information or position information of at least one second electronic device.

11. The method of claim 1,
- wherein the determining of the at least one second application in response to the user event comprises determining at least one second application among executed applications, based on an execution state attribute of the executed applications, and
- wherein the execution state attribute of the executed applications includes at least one of information on whether the application is being executed or is in an execution standby state, information on whether the application is loaded on an execution history or a memory, information on whether the application is scheduled to be executed by a configuration of a timer, information on whether the application is connected to a second electronic device connected to communicate through a network, or information on whether an interrupt is registered.

12. An electronic device comprising:
- at least one processor;
- an input interface configured to receive a user event;
- a display configured to output a screen; and
- at least one memory storing one or more computer programs configured to be executed by the at least one processor, wherein the one or more computer programs include instructions to at least:
  - identify data of a first application,
  - determine an application having an execution state attribute corresponding to the user event as at least one second application, in response to the user event,
  - identify an attribute of each of the at least one second application,
  - change a state of the at least one second application according to the user event,
  - change a format of the data of the first application based on the attributes of each of the at least one second application, and
  - execute a function related to the at least one second application using the changed data and based on the attributes of the at least one second application,
- wherein the changing of the state includes changing of a mode of the at least one second application.

13. The electronic device of claim 12, wherein the one or more computer programs further include instructions to receive the user event which shifts a window of the first application to a random position of a window of at least one executed second application, and display the window of the first application correspondingly to the user event.

14. The electronic device of claim 12, wherein the one or more computer programs further include instructions to perform at least one of:
- determining a sub-window of the at least one second application in response to the user event and identifying an attribute of the sub-window of the at least one second application;
- determining data of the at least one second application in response to the user event and identifying an attribute of the data of the at least one second application;
- determining the function related to the at least one second application in response to the user event and identifying an attribute of the function related to the at least one second application;
- changing a state attribute of the at least one second application according to the user event; or
- determining at least one second electronic device related to the at least one second application according to the user event and identifying each attribute of at least one second electronic device.

15. The electronic device of claim 14, wherein the one or more computer programs further include instructions to perform at least one of:
- transferring the data of the first application to the at least one second application in a format determined based on the attribute of the sub-window of the at least one second application;
- processing the data of the first application to execute the function related to the at least one second application, based on the attribute of the data of the at least one second application;
- changing a format of the data of the first application based on the attribute of the function related to the at least one second application to execute the function related to the at least one second application;
- processing the data of the first application to execute the function related to the at least one second application, based on the state attribute of the at least one second application; or
- transferring the data of the first application to at least one second electronic device, based on an attribute of at least one second electronic device.

16. The electronic device of claim 12, wherein the one or more computer programs further include instructions to process the identified data as at least one of a thumbnail image, a text obtained by an optical character recognition (OCR), raw data, processed data, a link, or effective information, based on the attribute of the at least one second application.

17. The electronic device of claim 12, wherein the one or more computer programs further include instructions to:
- generate the data of the first application as a thumbnail image, a text obtained by an OCR, raw data, processed data, a link or effective information,
- select the data of the first application corresponding to the attribute of the at least one second application, among the generated data of the first application, and
- execute the function related to the at least one second application using the selected data of the first application.

18. The electronic device of claim 12,
- wherein the one or more computer programs further include instructions to determine the attribute of the transferred data of the first application based on an attribute of the user event, and wherein the attribute of the transferred data of the first application includes at least one of an amount, a size, a brightness or a maintenance time of the transferred data.

19. The electronic device of claim 12, wherein the one or more computer programs further include instructions to perform at least one of:
   when the format of the data of the first application is changed and the function related to the at least one second application is executed, ending the execution of the first application;
   when a selection input for the data of the first application is provided from the function related to the executed at least one second application, re-executing the first application; or
   when the data of the re-executed first application is changed, reflecting the changed data to the function related to the executed at least one second application.

20. The electronic device of claim 13, wherein the one or more computer programs further include instructions to identify at least one of network information, resolution information, processor performance information or position information of at least one second electronic device.

21. The electronic device of claim 12,
   wherein the one or more computer programs further include instructions to determine the at least one second application among the executed applications, based on an execution state attribute of executed applications, and
   wherein the execution state attribute of the executed applications includes at least one of information on whether the application is being executed or is in an execution standby state on at least one processor, information on whether the application is loaded on an execution history or a memory, information on whether the application is scheduled to be executed by a configuration of a timer, information on whether the application is connected to a second electronic device connected to communicate through a network, or information on whether an interrupt is registered.

* * * * *